(12) United States Patent
Byrnes et al.

(10) Patent No.: US 12,542,196 B2
(45) Date of Patent: Feb. 3, 2026

(54) UNSUPERVISED INVERTIBLE PHYSICS-BASED VECTOR REPRESENTATION FOR MOLECULES

(71) Applicant: SRI International, Menlo Park, CA (US)

(72) Inventors: John J. Byrnes, Poway, CA (US); Richard J. Rohwer, San Diego, CA (US); Kevin J. Luebke, Staunton, VA (US); Peter Madrid, San Jose, CA (US)

(73) Assignee: SRI International, Menlo Park, CA (US)

( * ) Notice: Subject to any disclaimer, the term of this patent is extended or adjusted under 35 U.S.C. 154(b) by 730 days.

(21) Appl. No.: 17/909,959

(22) PCT Filed: Jun. 23, 2021

(86) PCT No.: PCT/US2021/038592
§ 371 (c)(1),
(2) Date: Sep. 7, 2022

(87) PCT Pub. No.: WO2021/262792
PCT Pub. Date: Dec. 30, 2021

(65) Prior Publication Data
US 2023/0103487 A1    Apr. 6, 2023

Related U.S. Application Data

(60) Provisional application No. 63/043,480, filed on Jun. 24, 2020.

(51) Int. Cl.
*G16B 15/00* (2019.01)
*G16B 40/00* (2019.01)

(52) U.S. Cl.
CPC ............. *G16B 40/00* (2019.02); *G16B 15/00* (2019.02)

(58) Field of Classification Search
CPC ........ G16B 15/00; G16B 40/00; G16C 20/30; G16C 20/50; G16C 20/70; G06N 3/042; G06N 20/20
See application file for complete search history.

(56) References Cited

U.S. PATENT DOCUMENTS

2019/0108320 A1    4/2019    Fan et al.
2019/0156224 A1    5/2019    Cecchi et al.

FOREIGN PATENT DOCUMENTS

JP    2019028879 A    2/2019

OTHER PUBLICATIONS

International Search Report and Written Opinion, PCT/US2021/038592, ISA:US, Nov. 17, 2021, 16 pages.

(Continued)

*Primary Examiner* — Grace Park
(74) *Attorney, Agent, or Firm* — Rutan and Tucker, LLP

(57) ABSTRACT

The Artificial Intelligence engine can perform one or more operations. A query can be submitted to the Artificial Intelligence engine to search directly for a set of targeted properties for an unnamed molecule having the set of targeted properties. An indication of a structure of one or more candidate molecules found to have the set of targeted properties with the Artificial Intelligence engine is generated by applying one or more machine learning algorithms. The indication of the structure of the one or more candidate molecules found to satisfy the set of targeted properties in 3-dimensional space is supplied to a user in response to the query for the set of targeted properties to the Artificial Intelligence engine.

14 Claims, 13 Drawing Sheets

(56) References Cited

OTHER PUBLICATIONS

Maksov, A. "Artificial Intelligence in Materials Science: Applications of Machine Learning to Extraction of Physically Meaningful Information from Atomic Resolution Microscopy Imaging," Dec. 31, 2018, TRACE: Tennessee Research and Creative Exchange.

UNSUPERVISED INVERTIBLE PHYSICS-BASED VECTOR REPRESENTATION FOR MOLECULES

CROSS-REFERENCE

This application is a 35 U.S.C. § 371 U.S. National Stage of International Patent Application No. PCT/US2021/038592, titled "UNSUPERVISED INVERTIBLE PHYSICS-BASED VECTOR REPRESENTATION FOR MOLECULES" having an International Filing Date of Jun. 23, 2021 which claims priority under 35 USC 119 to U.S. provisional patent application Ser. No. 63/043,480, titled "Unsupervised invertible physics-based vector representation for molecules," filed 24 Jun. 2020, which the disclosure of such is incorporated herein by reference in its entirety.

TECHNICAL FIELD

An embodiment of a concept herein relates to techniques and tools in Artificial Intelligence computing.

BACKGROUND

As known, a diamond and graphite are two molecules with the same chemical composition, but extremely different physical properties for each molecule. In both, carbon is joined by covalent bonds, but in graphite the carbon atoms form sheets that are weakly bonded together. In diamond, the carbon forms a three-dimensional framework. Isomers are an example class of molecules that have the same molecular formula but different molecular geometries giving them different molecular properties for the same molecular formula.

Accordingly, generating new compounds in different applications (e.g. drug discovery, novel fuel components, etc.) requires expensive cycles of designing molecules with geometries that may give desired characteristics, synthesizing the molecule in a chemistry lab, and testing the molecule to determine whether it has the targeted properties. Most Artificial Intelligence (AI) techniques have no standard use cases today for performing the task of generating new compounds with certain properties. For example, a typical AI technique can merely learn representations from molecules for which a property that users desire to predict is already known (i.e., from labeled molecules), which is not much more than a database correlation of a named molecule to its known properties; rather than, looking at the structures making up that molecule and then correlating each structure and/or combination of structures to the one or more properties resulting or likely to result for any molecule, named or unnamed, that contains the same or chemically very similar set of atoms and their geometry within a given molecule.

SUMMARY

Provided herein are various methods, apparatuses, and systems for an Artificial Intelligence based reasoning engine and explaining its reasoning process.

In an embodiment, the Artificial Intelligence engine can be composed of two or more modules that use one or more machine learning models. The molecule property predictor module cooperates with a molecule vector module to predict molecular properties from a molecule [semantic-dependent] vector field in a 3-dimensional space. An input module cooperates with the molecule vector module, the molecule property predictor module, and an atom vector module, to allow these modules to apply the one or more machine learning models to allow a user 1) to input two or more atoms and have a first machine learning model in the molecule property predictor module output a set of properties for a resulting molecule formed by the two or more atoms, as well as 2) to supply an input of a set of targeted properties for an unlabeled molecule and have the first machine learning model output a set of atoms and a geometric structure for the unlabeled molecule. In an embodiment, a labeled molecule is data that comes with a tag or other meta data to assist in identifying the molecule, like a name, a type, or a number. An unlabeled molecule is data that comes with no tag.

In an embodiment, the Artificial Intelligence engine can perform one or more operations. A query can be submitted to the Artificial Intelligence engine to search directly for a set of targeted properties for an unnamed molecule having the set of targeted properties. An indication of a structure of one or more candidate molecules found to have the set of targeted properties with the Artificial Intelligence engine is generated by applying one or more machine learning algorithms. The indication of the structure of the one or more candidate molecules found to satisfy the set of targeted properties in 3-dimensional space is supplied to a user in response to the query for the set of targeted properties to the Artificial Intelligence engine. These and many more embodiments are discussed below.

DRAWINGS

Figure 9:
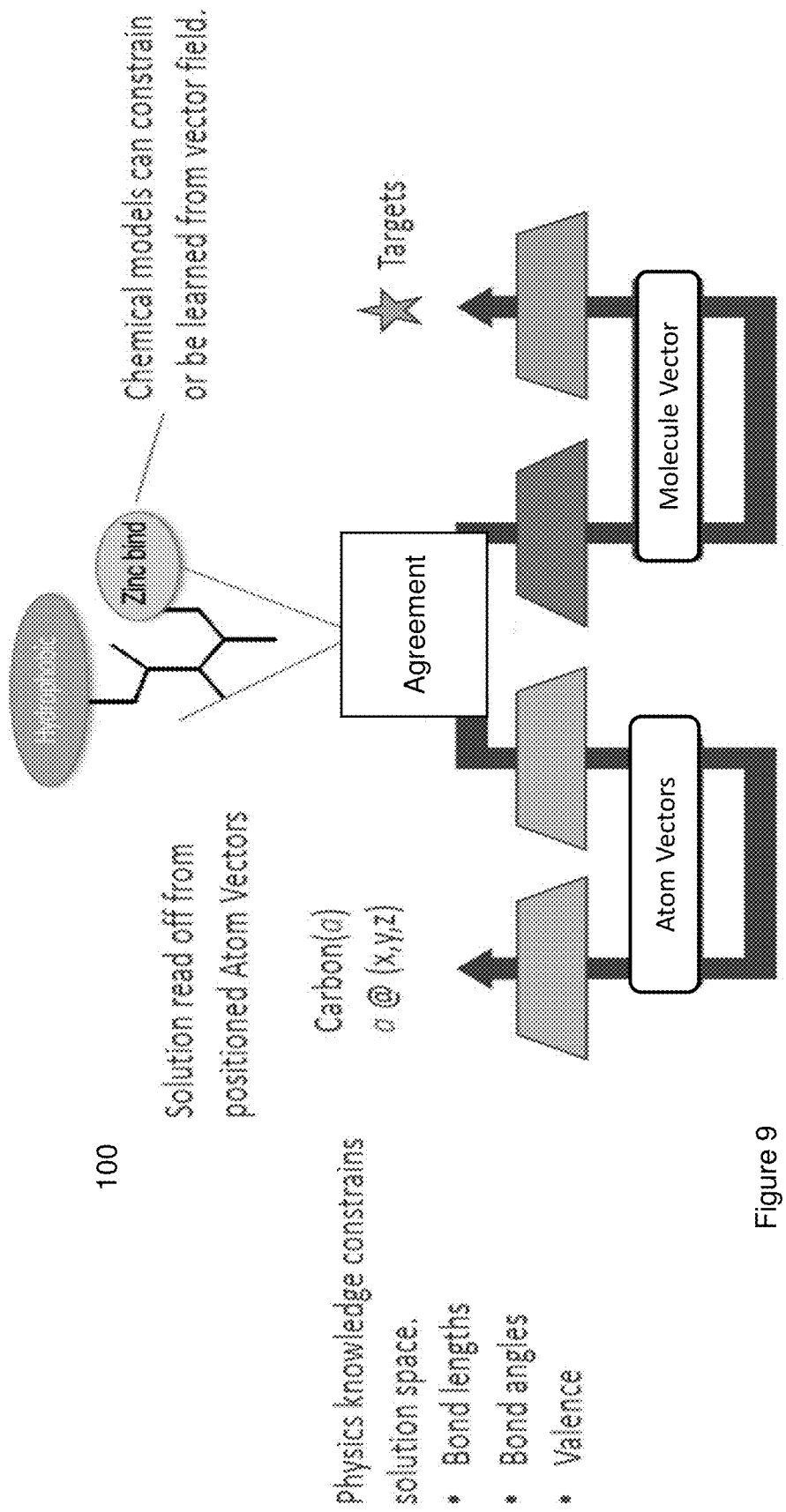
Figure 10:
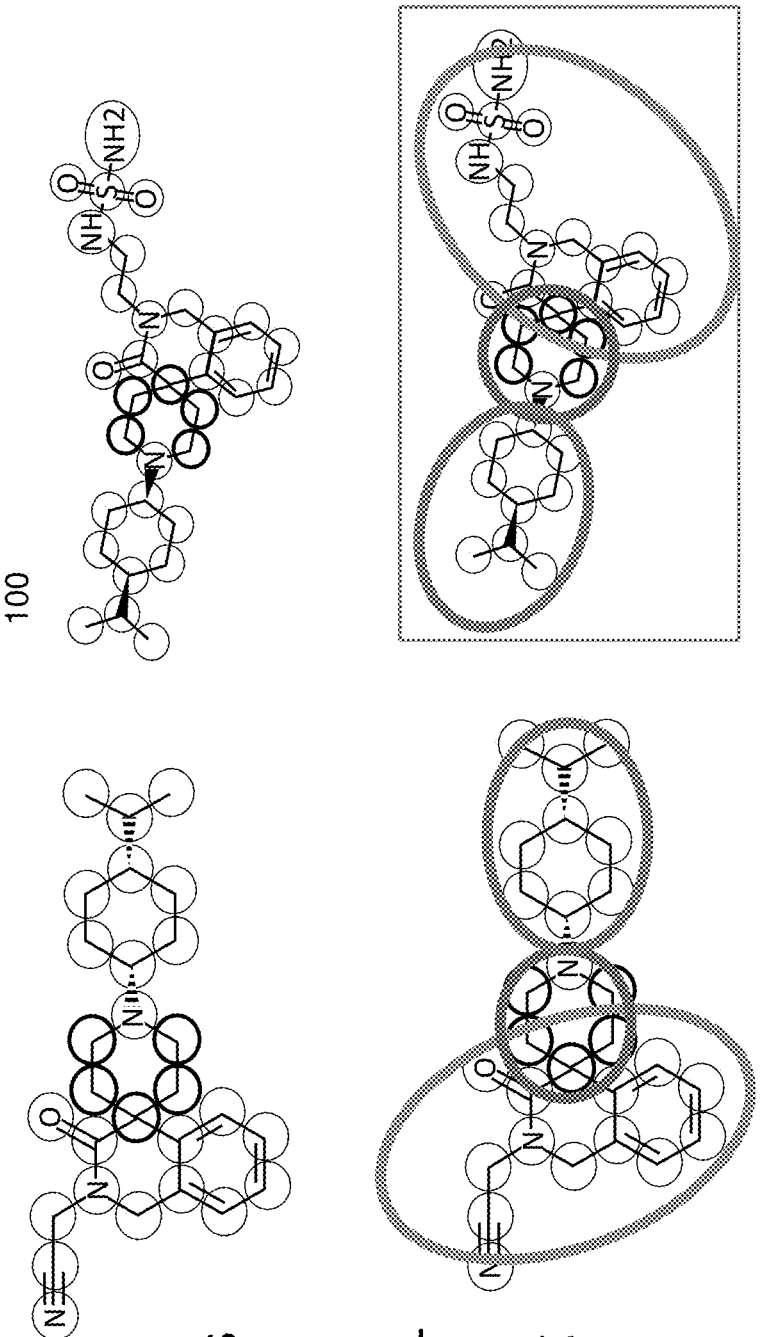
Figure 11:
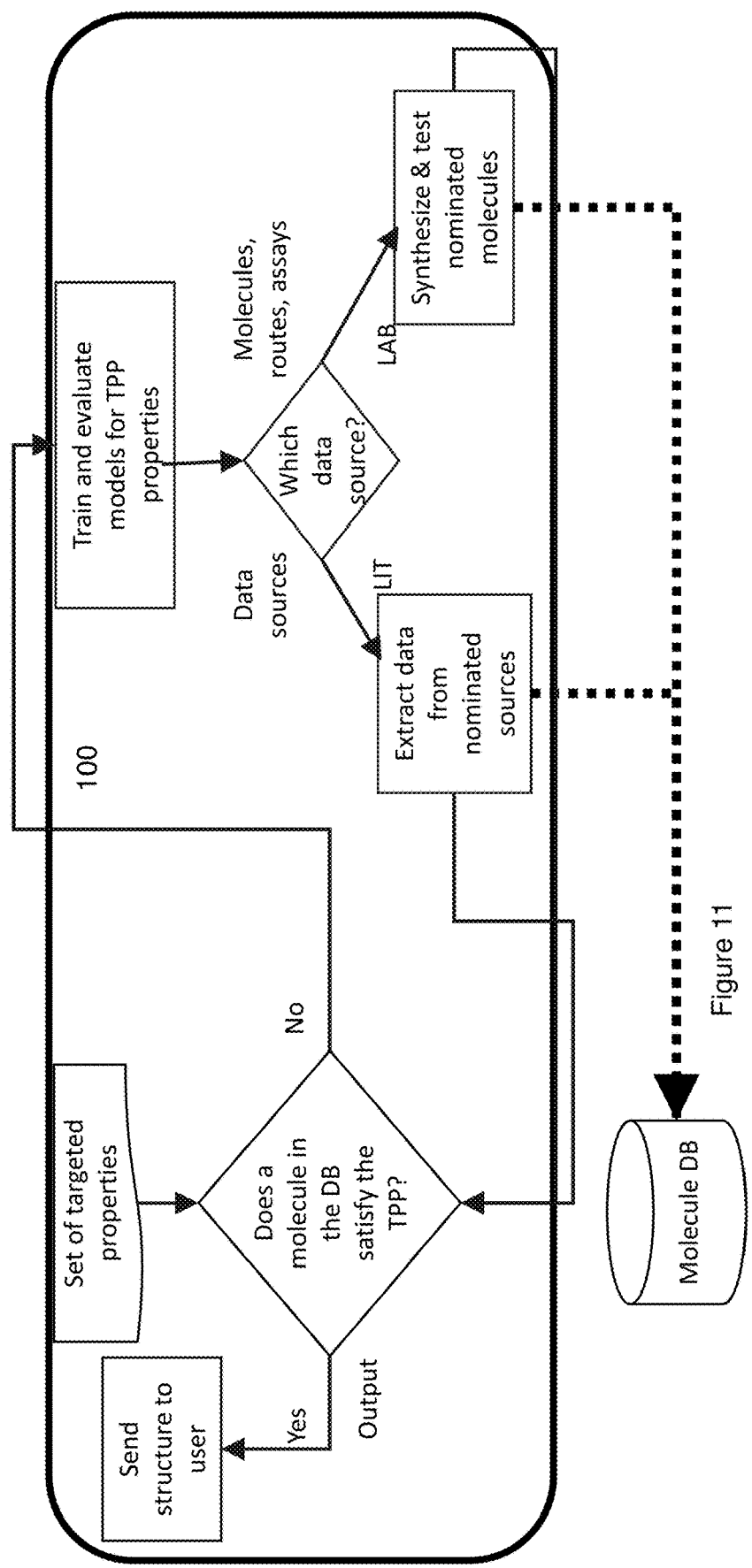
Figure 12:
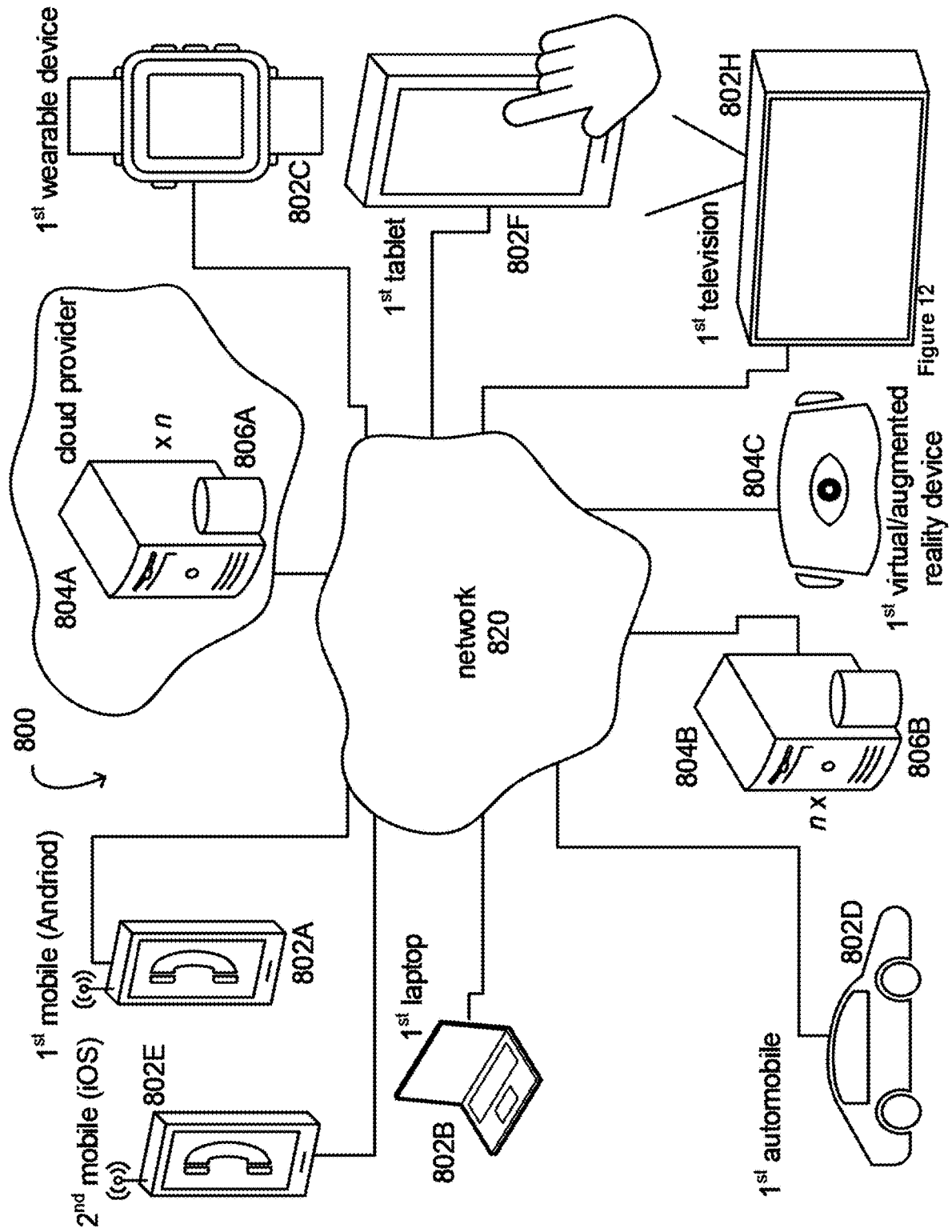
Figure 13:
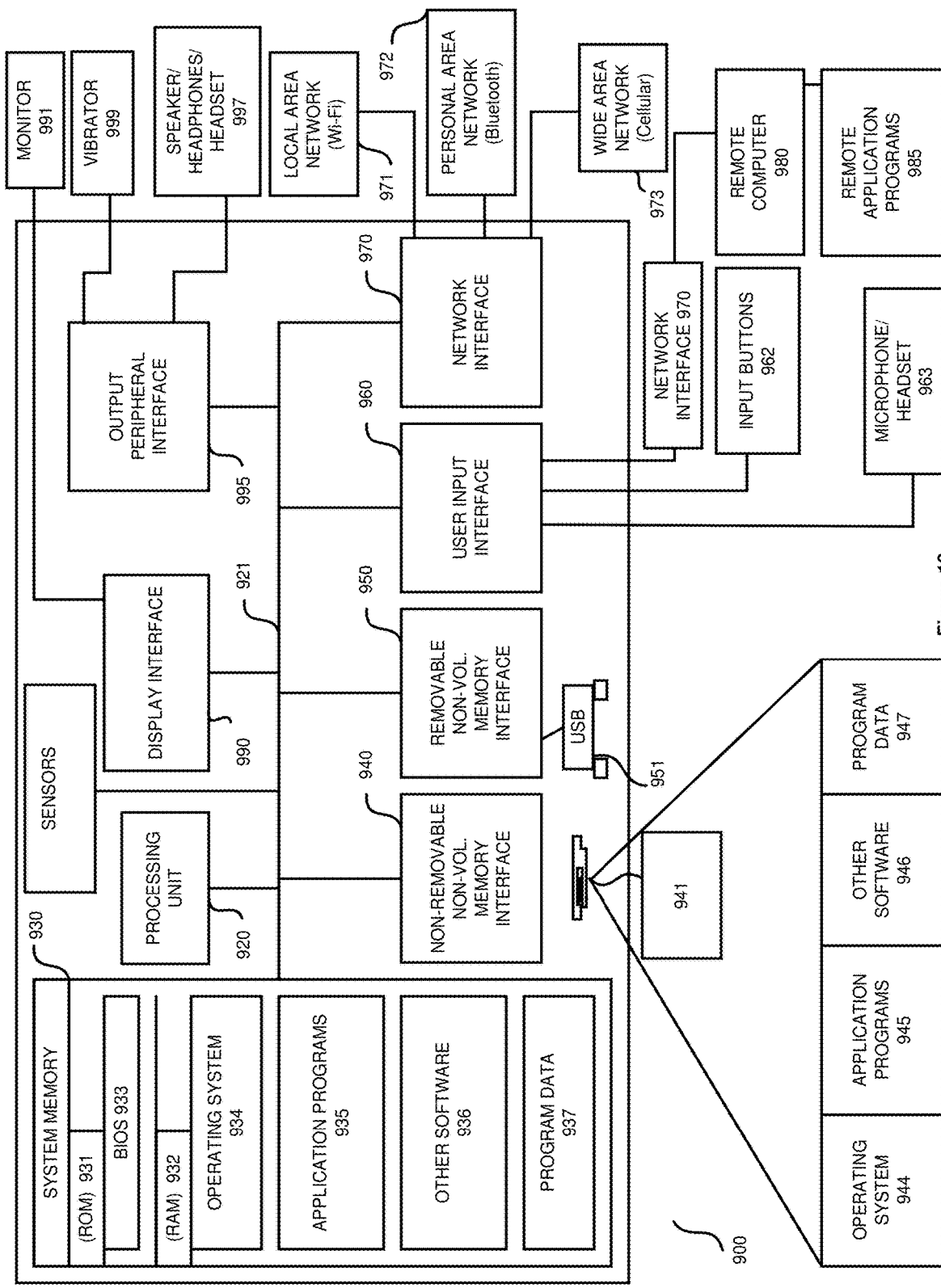

FIG. 9 illustrates an embodiment of a diagram of an example input module that is configured to receive and supply information from one or more knowledge sources, including at least information from a chemistry expert, to act as one or more constraints to adapt the machine learning to find a candidate molecule vector field to agree with an atom vector field in order to fit the constraints created by the information;

FIG. 10 illustrates an embodiment of a diagram of an example Artificial Intelligence engine recognizing patterns of structures in molecules so that molecular properties can be correlated to structural properties in the molecule;

FIG. 11 illustrates an embodiment of a diagram of an example Artificial Intelligence engine that can generate physics-based, vector representations for testing and predicting molecules;

FIG. 12 illustrates a diagram of a number of electronic systems and devices communicating with each other in a network environment in accordance with an embodiment of the Artificial Intelligence engine; and FIG. 13 illustrates a diagram of an embodiment of one or more computing devices that can be a part of the systems associated with the Artificial Intelligence engine discussed herein.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of models, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first server, can be made. However, the specific numeric reference should not be interpreted as a literal sequential order but rather interpreted that the first server is different than a second server. Thus, the specific details set forth can be merely exemplary. The specific details can be varied from and still be contemplated to be within the spirit and scope of the present design. The term "coupled" is defined as meaning connected either directly to the component or indirectly to the component through another component.

The Artificial Intelligence engine, such as a Deep Adaptive Semantic Logic Network, has a highly flexible architecture with its modules that captures a molecular structure in 3D space. An example Deep Adaptive Semantic Logic Network is described in PCT application number PCT/US 18/31645 entitled, "Deep Adaptive Semantic Logic Network" filed May 8, 2018, and the contents of, which are incorporated by reference herein its entirety.)

Overall, this document will initially discuss a specific task performed by the machine learning networks in the modules to give the reader a comprehension of this design. Later, this document will discuss multiple example tasks that this design can support and perform.

Figure 1:
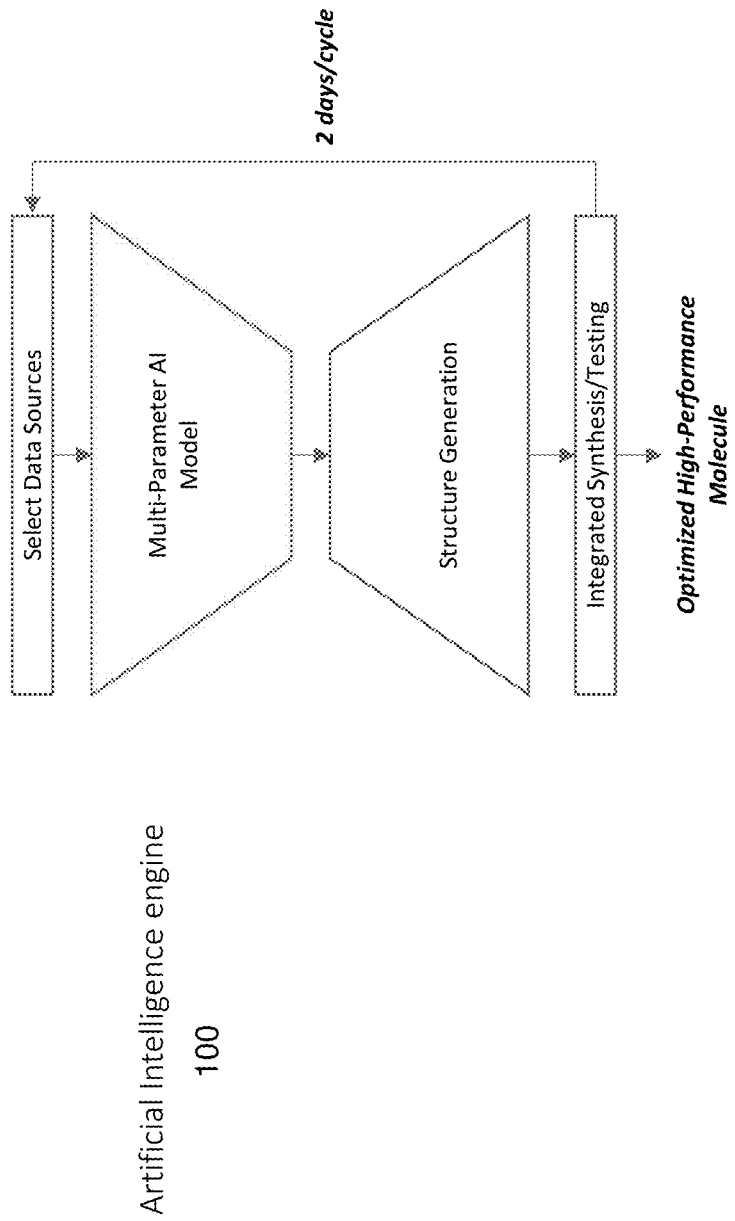
FIG. 1 illustrates an embodiment of a diagram of an example high level representation of a system with an Artificial Intelligence engine that can receive an input of a set of targeted properties for an unnamed molecule from the user, and then output candidate molecules likely to have those set of targeted properties.

FIG. 1 illustrates an embodiment of a diagram of an example high level representation of a system with an Artificial Intelligence engine that can receive an input of a set of targeted properties for an unnamed molecule from the user, and then output candidate molecules likely to have those set of targeted properties. A multi-parameter Artificial Intelligence model as part of the Artificial Intelligence engine 100 can supply a candidate molecule with a set of targeted properties to the modules in the structural generation stage (e.g. the agreement comparator module, atom vector module, molecule vector module, and 3D vector field module). The Artificial Intelligence engine 100 can then correlate that molecule and its structure back to the atoms and their structure that would make up that candidate molecule with the set of targeted properties. Note a candidate molecule can be a labeled molecule, an unlabeled molecule, and/or a molecule within a set of molecules containing a combination of both unlabeled and labeled molecules. Next, integrated synthesis and testing can be performed for the atoms and their structure that would make up that candidate molecule with the set of targeted properties to see if an optimized high-performance molecule having those set of targeted properties can be created.

Figure 2:
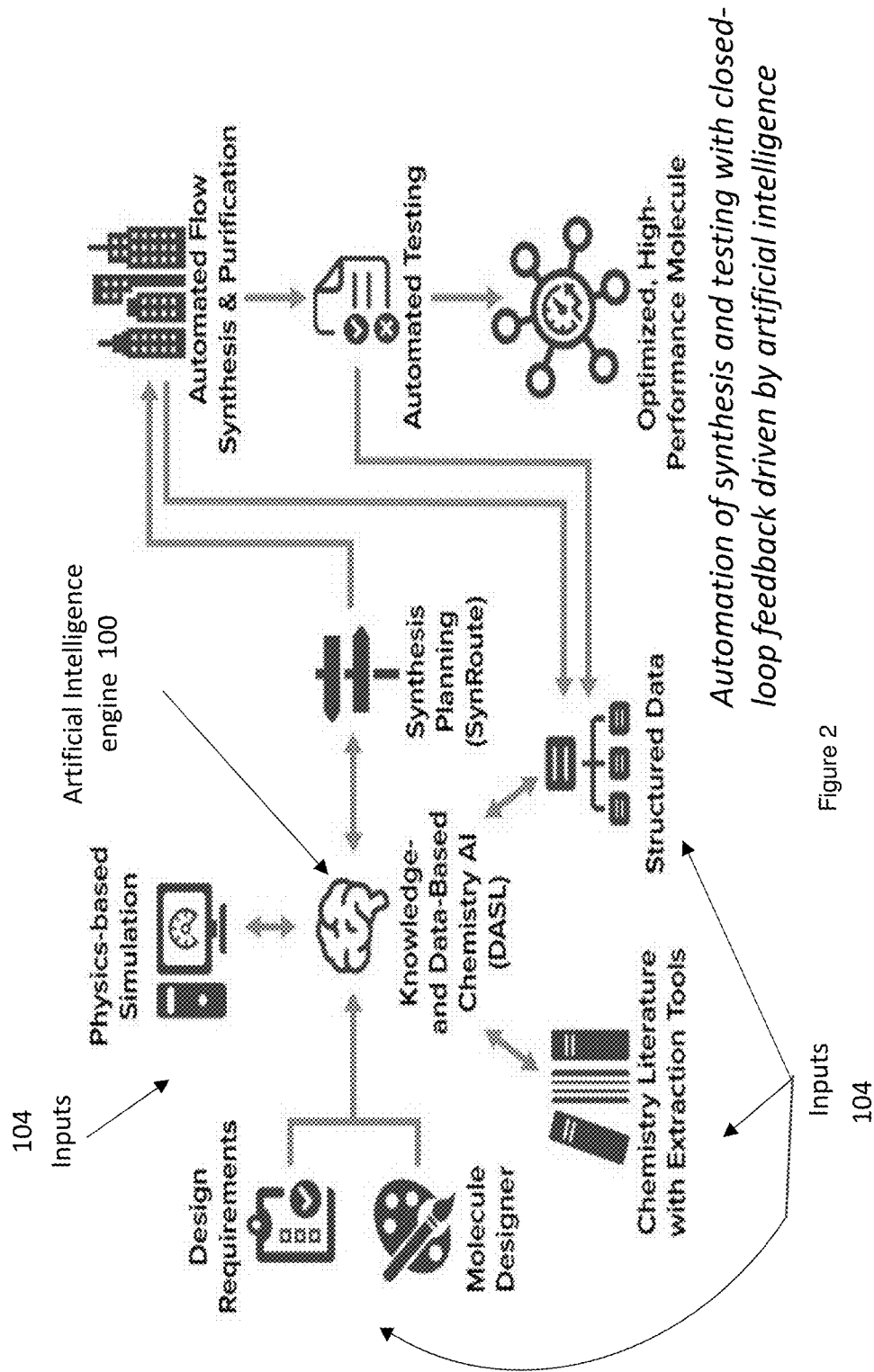
FIG. 2 illustrates an embodiment of a diagram of a more detailed example system with an Artificial Intelligence engine that uses an unsupervised, invertible, physics-based, vector representation for generating, testing, and predicting molecules.

FIG. 2 illustrates an embodiment of a diagram of a more detailed example system with an Artificial Intelligence engine that uses an unsupervised, invertible, physics-based, vector representation for generating, testing, and predicting molecules.

A query can be submitted to the Artificial Intelligence engine 100 to search directly for a set of targeted properties for an unnamed molecule having the set of targeted properties. An indication of a structure of one or more candidate molecules found to have the set of targeted properties is generated with the Artificial Intelligence engine 100 by applying one or more machine learning algorithms. The indication of the structure of the one or more candidate molecules found to satisfy the set of targeted properties in 3-dimensional space is supplied to a user in response to the query for the set of targeted properties to the Artificial Intelligence engine 100.

The system can include i) a chemistry knowledge, ii) structured data, such as data on a geometric structure of a molecule, that can be used as training data, iii) extraction tools from chemistry literature, which can be used in the training data, iv) an input from a molecular designer such as molecule design/target properties requirements, v) a physics-based simulation, vi) a synthesis planning process, vii) an automated flow synthesis and purification system, viii) an automated testing system, and ix) and a feedback loop to generate an optimized high-performance molecule. These components all cooperate to enable the design of synthesizable compounds from a set of targeted properties.

The training data extraction and enhancement can come from several sources such as i) a public database extraction, ii) manually entered from, for example, an expert in the field, iii) extracted from chemistry literature, and iv) utilizing internal knowledge from previous results from the Artificial Intelligence engine 100, etc.

The physics-based simulation information can, for example, supply information about the molecules and how valences and bonds affect molecule properties, etc.

The Artificial Intelligence engine 100 can predict molecular properties computationally, reducing the number of iterations through the physical design-make-test cycle. This can greatly reduce the number of iterations a synthetic chemist would have to go through to arrive at an optimized compound.

The candidate molecule with its geometric structure generated can go through the integrated synthesis and testing, which is fed back through a feedback loop into the machine learning networks of the Artificial Intelligence engine 100. Thus, the synthesis and testing can occur with closed-loop feedback driven by artificial intelligence. An example feedback loop in this process can start with the user. The user, in this example, a molecule design expert, supplies their desired information (e.g. a set of target properties in a molecule). The Artificial Intelligence engine 100 and its trained modules apply the machine learning process to find one or more candidate molecules and their structure as well as then output the atoms and their structure composing the candidate molecule. The output module for the Artificial Intelligence engine 100 provides a representation of the candidate molecule to the synthesis planning process module (?) as well as to the automated flow synthesis and purification process modules (?). The candidate molecule can go through automated testing and then supply the results of the testing back to the Artificial Intelligence engine 100 to update the Artificial Intelligence models and their networks in the modules. Eventually, this feedback loop and design process can generate an optimized high-performance molecule.

Figure 3:
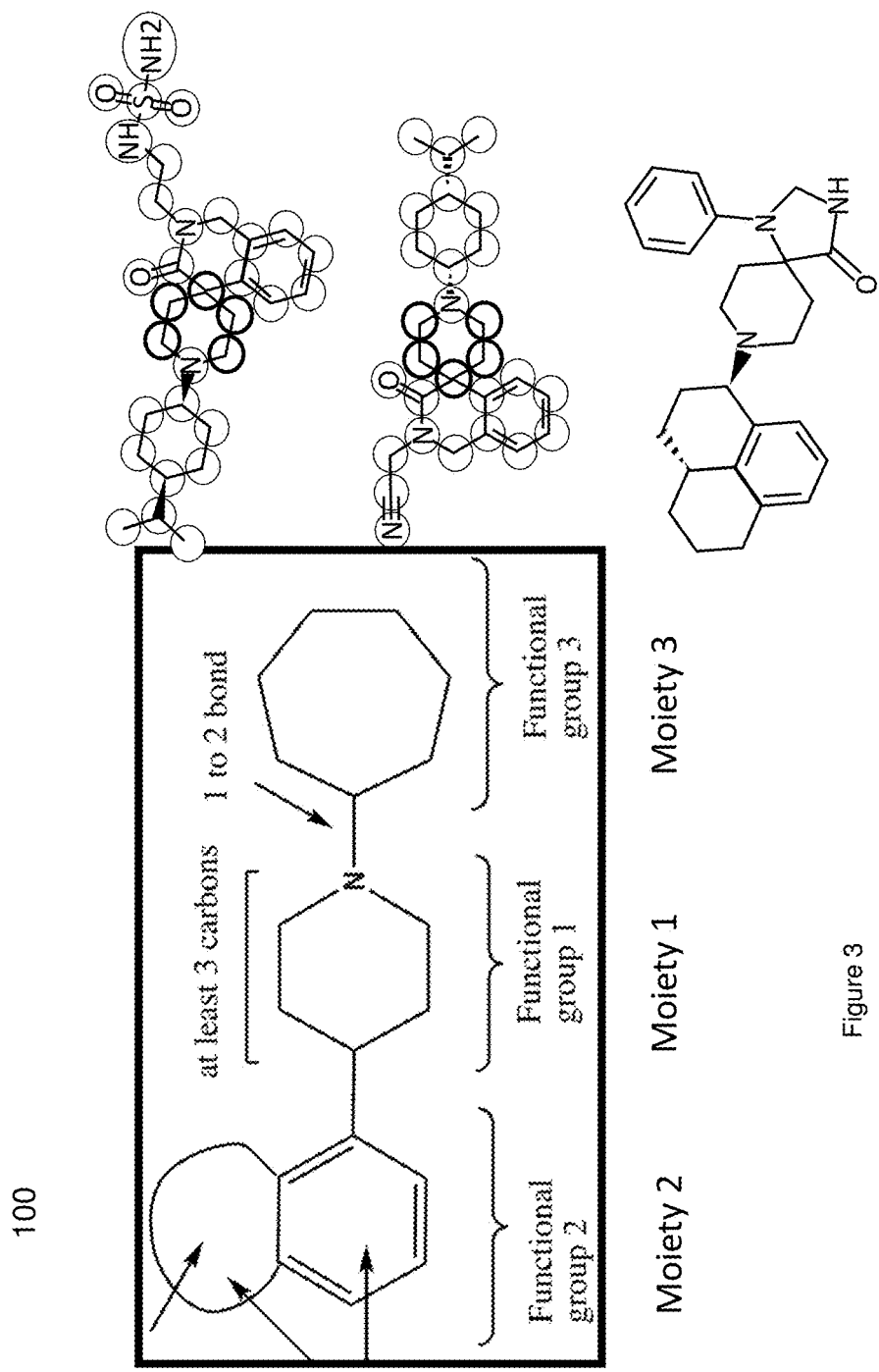
FIG. 3 illustrates an embodiment of a diagram of an example Artificial Intelligence engine to find a candidate molecule that is found to likely satisfy the set of targeted properties.

FIG. 3 illustrates an embodiment of a diagram of an example Artificial Intelligence engine to find a candidate molecule that is found to likely satisfy the set of targeted properties.

The Artificial Intelligence engine 100 reconstructs i) a 3-dimensional vector field of a structure of a first candidate molecule found that satisfies the set of targeted properties ii) with a structure of atom vectors from one or more atoms in a same 3-dimensional space.

The Artificial Intelligence engine 100 can have logic to write structure-based rules that capture many examples correctly and then apply that knowledge to extend the structure knowledge to real and/or hypothetical molecules that have not been trained on. The Artificial Intelligence engine 100 can recognize moiety/part of a molecule associated with a given function to the example functional groups of atoms causing Moiety 1, Moiety 2, and Moiety 3. (For example, see FIG. 11) In this example, moiety recognition with the machine learning networks is applied to ligand model to examples corresponding to three different functional groups of various atoms within a structure of a molecule.

Figure 4:
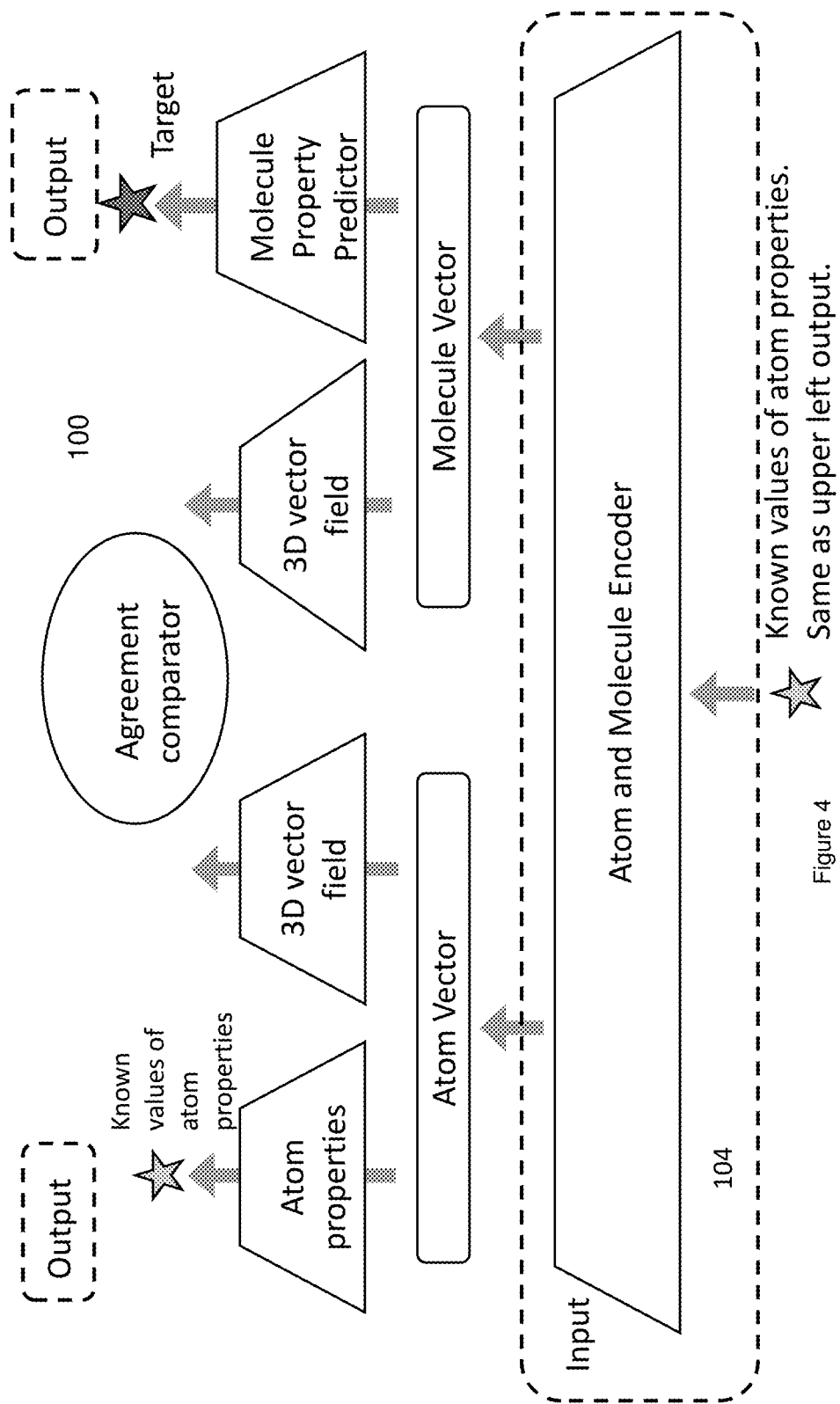
FIG. 4 illustrates an embodiment of an example block diagram of an example Artificial Intelligence engine composed of two or more modules that use one or more machine learning models trained to do multiple operations including generating representations of geometric structures of molecules.
Figure 5:
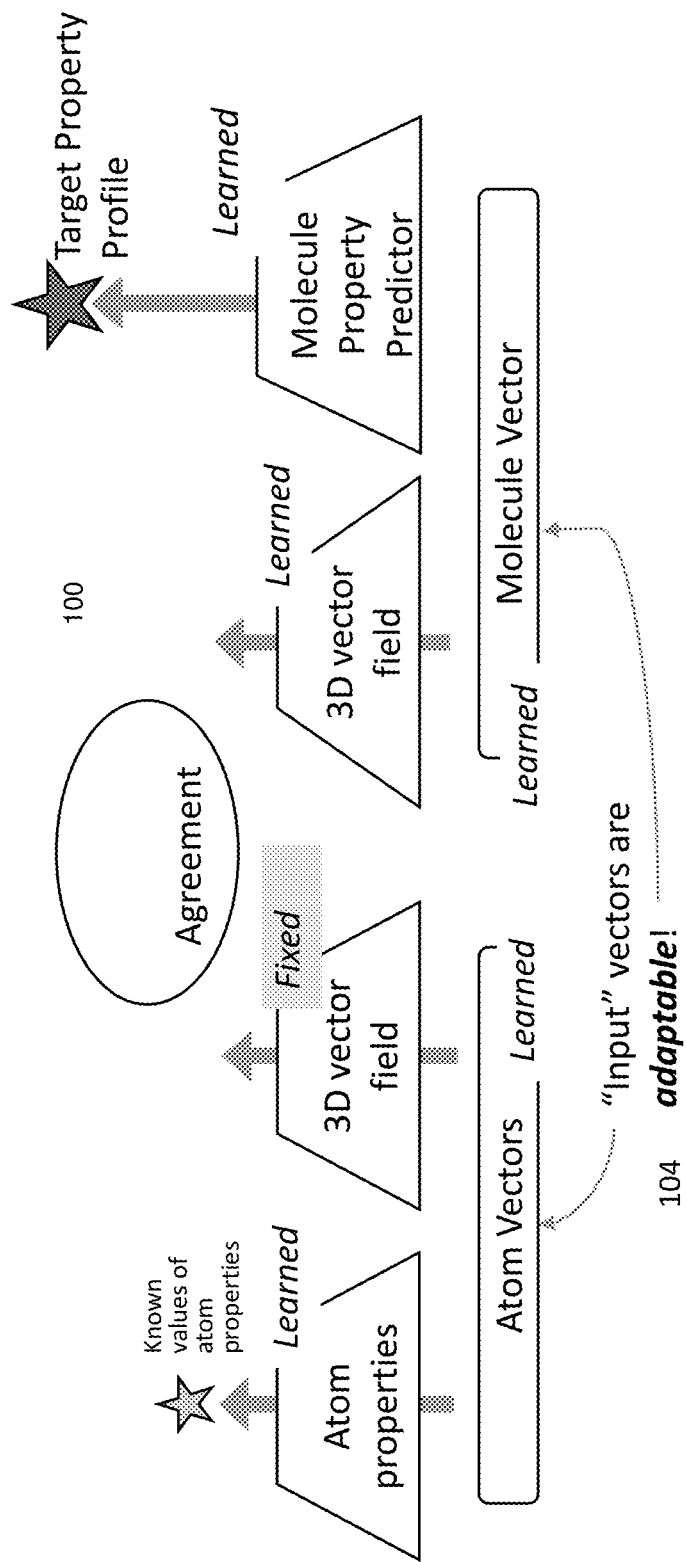
FIG. 5 illustrates an embodiment of an example block diagram of an example Artificial Intelligence engine and example modules with inputs directly into an atom vector module and/or a molecule vector module.

Training and General Construction and Operation of the Artificial Intelligence Engine Including its Modules FIG. 4 illustrates an embodiment of an example block diagram of an example Artificial Intelligence engine composed of two or more modules that use one or more machine learning models trained to do multiple operations including generating representations of geometric structures of molecules. FIG. 5 illustrates an embodiment of an example block diagram of an example Artificial Intelligence engine and example modules with inputs directly into an atom vector module and/or a molecule vector module.

An example embodiment of the Artificial Intelligence engine 100 composed of two or more modules can include, for example, a molecule vector module, one or more 3D vector field modules, a molecule property predictor module, an atom vector module, an atom properties module, an input module 104 that can include an atom and molecule encoder module as well as an input pathway to most of the other modules, and an output module that collects outputs from most of the other modules in order to present those outputs to a user on, for example, a display screen. Those inputs and output for each module can help a user understand the machine learning reasoning within the Artificial Intelligence engine 100.

The input module 104 can cooperate with the molecule vector module, the molecule property predictor module, and the atom vector module, to allow these modules to apply one or more machine learning models to allow a user to input various information (For example, see FIG. 2) and have the Artificial Intelligence engine 100 perform multiple operations. For example, a user can 1) input two or more atoms and have a machine learning model in the molecule property predictor module output a set of properties for a resulting candidate molecule formed by the two or more atoms, as well as 2) supply an input of a set of targeted properties for an unlabeled/unnamed molecule and have the machine learning model output a set of atoms and a geometric structure for the unlabeled molecule. The modules can cooperate to look at the structures making up a molecule, under analysis, (as well as the inverse—a set of properties desired) and then correlate each structure and/or combination of structures over to the one or more properties resulting or likely to result for any molecule, named or unnamed, that contains the same or chemically very similar set of atoms and their geometric structure within a given molecule.

An agreement comparator module can have a machine learning model trained to compare an atom vector field to a molecule vector field in a 3-dimensional space and determine when they are approximately a same. Note, the geometric structure of a molecule is formed by the set of atoms and their arrangement in the 3-dimensional space. (For example structures see FIG. 7, FIG. 8, and FIG. 11)

A molecule property predictor module is configured to cooperate with a molecule vector module to bilaterally correlate molecular properties to molecule vector values.

An atom properties module is configured to cooperate with an atom vector module to bilaterally correlate atom properties to atom vector values so that an output layer of the atom properties module will produce i) an identity of an atom and ii) values of the atom properties for a supplied atom vector value.

Overall, the Artificial Intelligence engine 100 can build and train either 1) a multiple input parameter machine learning model and/or 2) multiple machine learning models, (e.g. one per stage of this process.)

The modules need to train the machine learning, such as neural networks, on their tasks. Several specific tasks need to be learned. Arbitrarily, one can discuss training of the machine learning on the atom side (stage 1) of this Artificial Intelligence engine 100, then training of the machine learning on the molecule side (stage 2) of this Artificial Intelligence engine 100, and then training of the machine learning on a correlation between a structure of the atom side and a structure of the molecule side (stage 3).

Stage 1 training on the machine learning on the atom side discusses a bilateral correlation of properties of an atom to a structure of the atom in 3-dimensional space. Stage 2 training on the machine learning on the molecule side discusses a bilateral correlation of properties of a molecule to a specific structure in the molecule causing that property in 3-dimensional space. Stage 3 training on the machine learning discusses a bilateral correlation of a structure of a molecule in 3-dimensional space to one or more structures of sets of atoms and their arrangement in 3-dimensional space.

Figure 6:
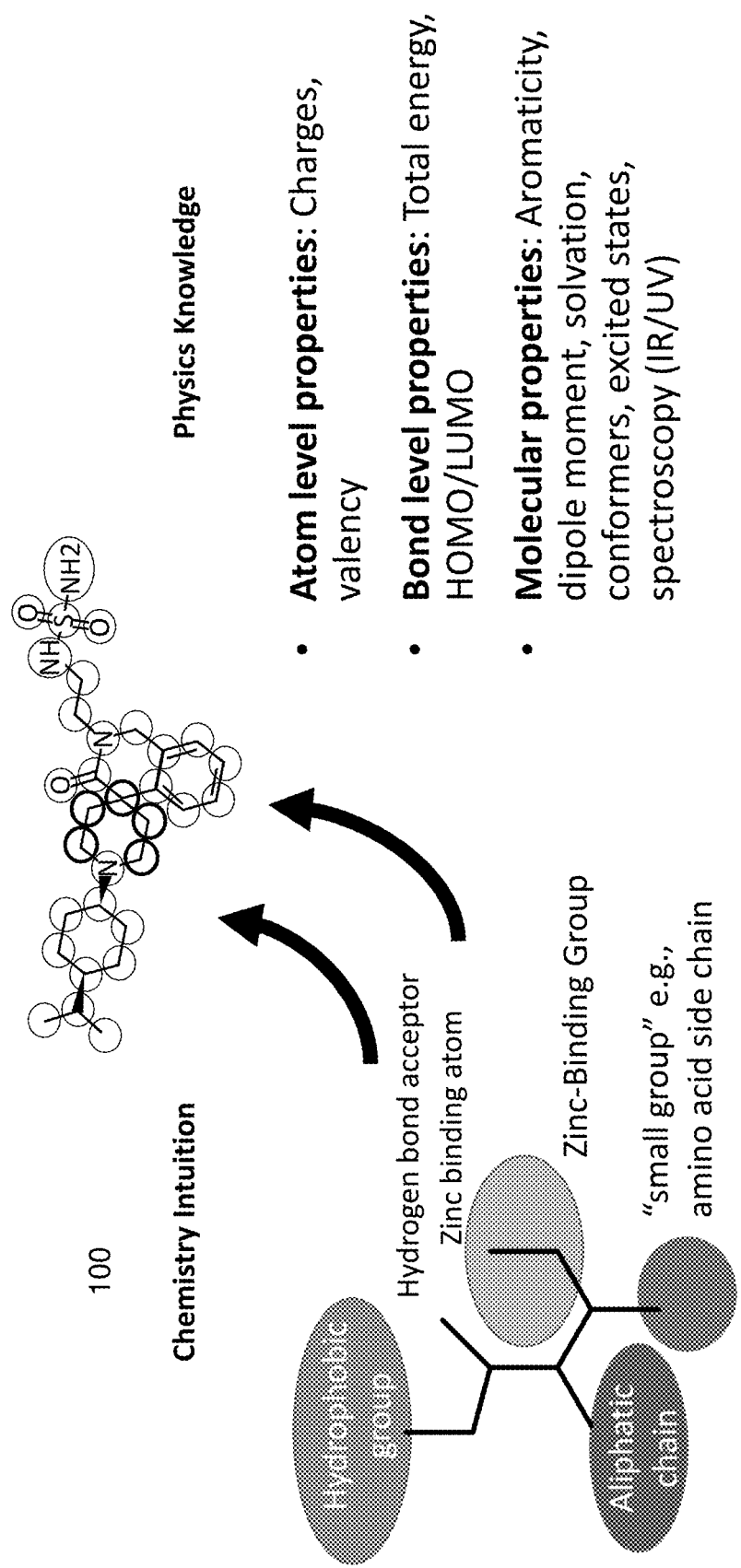
FIG. 6 illustrates an embodiment of an example block diagram of example molecular properties of a molecule, under analysis, to values of structural properties for that molecule under analysis.

FIG. 6 illustrates an embodiment of an example block diagram of example molecular properties of a molecule, under analysis, to values of structural properties for that molecule under analysis by having a molecule semantic dependent vector field in each space of the molecule under analysis in the 3-dimensional space.

Note, some general discussion on molecular properties and structure of a molecule follows. The machine learning between i) the atom vector module and the atom properties module as well as ii) the molecule vector module and molecule property predictor module have an understanding of these basic theories and relationships. Molecules are made up of atoms held together by covalent bonds, etc., in specific positions relative to one another, with a spatial distribution of its atoms, etc. As a result, each molecule has a relatively defined geometric structure. In a molecule, the atoms are in 3D space allowing a molecule to be formed in multiple dimensional ways with essentially the same atoms. For example, rotations of bonds (e.g. different atoms can connect in different geometric arrangements resulting in different bond angles). Again, isomers are an example class of molecules that have the same molecular formula but different molecular geometries giving them different molecular properties for the same molecular formula.

Molecular properties of a molecule can include a very large amount of different properties, but some example properties can include stability, solubility, toxicity, inhibition, aromaticity, dipole moment, solvation, conformers, excited states, spectroscopic characteristics (IR/UV), etc. The molecular properties can be associated with the geometric structure of that molecule.

Next, referring back to FIG. 4, after the three basic tasks in stages 1-3 of training are learned by the machine learning network, such as neural networks, Long Short Term Memory Networks, Deep Belief Networks, Random Forest, etc., in the modules of the Artificial Intelligence engine 100, then multiple inner-connected tasks can be trained on and learned by the machine learning networks in the modules of the Artificial Intelligence engine 100. Note, the text in paragraph 0044 discussed training stages 1-3, and the text that follows will discuss additional stages of training. For example, stage 4 below discusses training of the machine learning networks in the modules 1) to receive an input of a set of atoms and then on the output module 2) to output i) a resulting molecule including the structure of the molecule in 3-dimensional space, ii) a composition of atoms in the resulting molecule, as well as iii) a predicted set of properties for the resulting molecule, resulting from the inputted set of atoms. Stage 5 discusses training of the machine learning networks in the modules 1) to receive an input of a molecule and then on the output module 2) to output i) a resulting composition of atoms for the molecule including each atom's arrangement/position in 3-dimensional space, and ii) a set of properties for each of the atoms and/or grouping of atoms, resulting from the inputted molecule. Stage 6 discusses training of the machine learning networks in the modules 1) to receive an input of a set of atom properties and then on the output module 2) to output i) a resulting molecule including the molecule's structure in 3-dimensional space, ii) a composition of atoms for the resulting molecule, as well as iii) a set of properties for the resulting molecule, resulting from the inputted set of atom properties. Stage 7 discusses training of the machine learning networks in the modules 1) to receive i) an input of a set of desired/targeted properties for an unnamed molecule and then on the output module 2) to output i) a resulting composition of atoms for the molecule with the desired/targeted set of properties as well as ii) each atom's arrangement/position in 3-dimensional space for the molecule with the desired/targeted properties, resulting from the inputted a set of desired/targeted properties. Other example operations the Artificial Intelligence engine 100 can be trained on and then later performed will naturally be understood from the examples in stages 4-7.

Step 0. For stages 1 and 3, a user through a user interface of the input module 104 can supply training atoms with known values of atom properties as well as a known geometric structure for that atom in 3-dimensional space to the atom vector module. The atom vector module can also reference information sources, such as a database, chemistry literature, a physics simulator, etc. (For example, see FIG. 2) to obtain the geometric arrangement of that atom being learned in 3-dimensional space. Either way, the atom vector module will represent the known atom with its known geometric arrangement of that atom in 3-dimensional space in vector format.

Likewise, for stages 2 and 3 training molecules with known values of molecule properties as well as a known geometric structure for that molecule in 3-dimensional space can be initially supplied to the molecule vector module by a user through the input module 104. Either way, the molecule vector module will represent the known molecule with its known geometric arrangement of that molecule in 3-dimensional space in vector format. Similarly, the molecule vector module can also reference information sources, such as a database, chemistry literature, a physics simulator, etc. (For example, see FIG. 2) to obtain the geometric arrangement of that molecule being learned in 3-dimensional space. In addition, an atom and molecule encoder can assist in providing the atom and molecule information.

Step 1. Stage 1 training on the machine learning on the atom side discusses a bilateral correlation of properties of an atom to an arrangement/position of the atom in 3-dimensional space.

The atom vector module is configured to correlate an atom under analysis to atom vectors for that atom that reflect an identity of the atom itself as well as the known arrangement/position (e.g. geometric structure) of the atom in 3-dimensional space. The atom vector module is configured to apply an algorithm to bilaterally correlate an atom and its known arrangement/position in 3-dimensional space to atom vector values for that atom. A portion of an example vector value for an atom can include (X, Y, Z) coordinates/point (e.g. 3, 5, 7) in a 3D plane. A portion of an example vector value for an atom can include an identity of the atom, such as a carbon atom, oxygen atom, etc. A portion of an example vector value for an atom can include other geometric structure information with respect to other atoms such as a single bonded carbon atom, a double bonded carbon atom, bond angles, etc.

The atom vector module is configured to cooperate with the atom properties module. The atom properties module is configured to correlate an atom to values of atom properties for that atom. The atom properties module can have a machine learning network in an AI model, such as a neural network, a Long Short Term Memory Network, a Deep Belief Network, etc. that learns to correlate an atom being learned to values of atom properties for that atom. The atom vector module provides, for an atom being learned, atom vectors for that atom which reflect an identity of the atom itself as well as the known position/arrangement of the atom in 3-dimensional space to the atom properties module. For training, both i) an identity of the atom, being learned, is known as well as ii) an arrangement/position of the atom in 3-dimensional space is known, from its atom vector value. An input layer of the machine learning model is fed the atom vector value for the atom being learned and, for example, 20 million examples of training data of atoms and their atom properties are learned for all of the potential properties associated with the atom being learned as well as values associated with the atom properties. The machine learning model can employ unsupervised learning algorithms to train on and/or put under analysis when deployed to use unclassified and unlabeled data, the unsupervised learning algorithm attempts to uncover patterns from the data. The machine learning model can employ supervised learning algorithms to train on and/or put under analysis when deployed to use supervised learning with examples along with their labels or targets for each example. The labels in the data help the learning algorithm to correlate the features. The machine learning network can also train on and then use some forms of reinforcement learning. In an embodiment, during training, no expert knowledge/rules or constraints are applied. Rather, the Artificial Intelligence engine 100 is configured to construct a multiple input machine learning model (including neural networks) and/or multiple machine learning models trained initially based on statistical data-driven learning with unlabeled training data and no constraints allowing for better recognition of patterns of atoms and/or group of atoms and possible molecules beyond merely the examples used in training.

The learning by the machine learning network can occur because the correct properties and values for the atom having that geometric structure in 3-dimensional space are known target values, for the atom being learned. Thus, the target values of the properties are known and the machine learning model predicts these target values for all of the atom properties. Thus, the coefficients and feature weights of the network in the machine learning model are adjusted until the atom properties module achieves a very high accuracy in predicting properties of the atom being learned and their values. The training continues until the machine learning model in the atom properties module can produce the correct values for all of the properties for an atom, such as charges, valency, etc., having that geometric structure in 3-dimensional space (e.g. the atom being learned but also any other atoms with a similar geometric structure in 3-dimensional space). From the examples, the machine learning network can identify and recognize patterns. Thus, the machine learning model learns to recognize patterns, parameters, values, and then to predict and effects associated with those patterns, parameters, values. The machine learning model naturally can characteristically generalize this understanding to atoms with similar structure patterns that may not have been trained on.

For each training atom, iteratively, the atom vector under training, is then fed from the atom vector module through the atom properties module until the, for example, neural network of the machine learning model can accurately predict the actually known values of the labeled and/or unlabeled training atom. Atom vectors and atom properties can be trained together with known values of atom properties for a given atom. This part of the Artificial Intelligence engine 100 is now trained so that when the Artificial Intelligence engine 100 is in deployment, then atom vector values from an atom and/or functional group of atoms, under analysis, can be put into the already trained atom properties module. The already trained atom properties module then accurately predicts known values of atom properties including what type of atom this is, such as a carbon atom, and other properties known about that carbon atom including its geometric structure in 3D space. (e.g. X, Y, Z coordinates/point in a 3D plane, type of valence bond, bond angles, etc.). During deployment, the already trained atom properties module and the atom vectors module bilaterally correlate. Note, an example use of the trained atom properties module and the atom vectors module is to apply them to the 3D vector embedding space so as to aid in coming up with the molecule(s) w/properties. 1) The input of desired atom properties can be supplied to an input layer of the trained atom properties module and an output layer of the atom vector value module will produce an atom vector value (that conveys the atom and its geometric structure in 3D space) that has those desired atom properties. 2) One or more atoms and/or atom vector values conveying a geometric arrangement of the atom or atoms in 3D space can be supplied to an input layer of the atom vector value module and an output layer of the trained atom properties module will produce the atom and the values of the atom properties for those inputted atoms and/or atom vector values.

Step 2. Stage 2 training on the machine learning on the molecule side discusses a bilateral correlation of properties of a molecule to a structure of the molecule in 3-dimensional space.

The molecule vector module is configured to correlate a molecule under analysis to molecule vectors for that molecule that reflect an identity of the molecule itself as well as the known geometric structure of the molecule in 3-dimensional space. The molecule vector module is configured to bilaterally correlate a molecule and its known geometric structure in 3-dimensional space to molecular vector values for that molecule.

The bilateral correlation of properties of a molecule to a structure of the molecule in 3-dimensional space is trained and constructed similarly to stage 1 for the atom but uses molecules instead.

The molecule vector module is configured to cooperate with the molecule property predictor module.

Again component wise, the molecule property predictor module is configured to correlate a molecule to values of molecule properties for that molecule. The molecule property predictor module can have a machine learning networks in an AI model such as a neural network, a Long Short Term Memory Network, a Deep Belief Network, etc. that learns to correlate a molecule being learned to values of molecule properties for that molecule. The molecule property predictor module cooperates with the molecular vectors to learn to map the molecular vectors of a molecule under analysis to target properties for this molecule.

In the training, the learning can occur because the correct properties and values for the molecule having that geometric structure in 3-dimensional space are known target values, for the molecule being learned. Thus, the target values of the properties are known and the machine learning model predicts these target values for all of the properties of the molecule. Thus, the coefficients and feature weights of the network in the machine learning model are adjusted until the property predictor module achieves a very high accuracy in predicting properties of the molecule being learned and their values. The training of, for example, the machine learning model, such as a neural network, for the property predictor continues until it can accurately predict the actually known values of the labeled training molecule from its molecular vector value. After this training, all of the weights of the neural networks in this AI model are now locked down. The training continues until the machine learning model in the property predictor module can produce the correct values for all of the properties for the molecule, such as solubility, toxicity, etc., having that geometric structure in 3-dimensional space (e.g. the molecule being learned but also any other molecules with a similar geometric structure in 3-dimensional space). Again, a characteristic of the machine learning, the machine learning model learns to recognize patterns and then parameters, values, and effects associated with those patterns. See FIG. 8's discussion on recognizing structure patterns within a molecule. The machine learning model naturally can characteristically generalize this understanding to molecules with similar structure patterns that may not have been trained on. For each training molecule, iteratively, the molecule vector under training is fed from the molecule vector module through the molecule property predictor module until the, for example, neural network of the machine learning model can accurately predict the actually known values of the labeled training molecule. This part of the system is now trained so that when the AI engine is in deployment, then molecular vector values from a molecule under analysis can be put into the already trained property predictor module. The already trained property predictor module then accurately predicts known values of properties including what is a geometric structure in 3D space for that molecule. During deployment, the already trained molecule property predictor module and the molecule vectors module bilaterally correlate. 1) The input of desired properties for a molecule can be supplied to an input layer of the trained molecule property predictor module and an output layer of the molecular vector module will produce a molecular vector value (that conveys the molecule and its geometric structure in 3D space) that has those desired properties for the molecule. 2) Molecules, via the molecule encoder, and/or molecular vector values that convey a geometric structure of the molecule in 3D space can be supplied to an input layer of the atom vector value module and an output layer of the trained molecule property predictor module will produce the molecule, if known, and the values of the molecule properties for the inputted molecule and/or molecular vector values.

Step 3. Stage 3 training on the machine learning discusses a bilateral correlation of a structure of a molecule in 3-dimensional space to a structure of an atom in 3-dimensional space.

An agreement comparator module uses a 3-dimensional field to couple an atom embedding to the molecule embedding. A 3D vector field module applies a 3D vector algorithm to the atom vector values to generate a semantic vector field in 3D space. The agreement comparator module cooperates with the 3D vector field module and the atom vector module to generate a property vector for the atom being learned at every point in 3D space. This creates the atom's embedding for the atom being learned. Iteratively for each atom being learned, the agreement comparator module cooperates with the 3D vector field module and the atom vector module to generate a property vector for each atom being learned at every point in 3D space.

Next, the 3D vector field cooperates with molecular vectors from the molecular vector module and the agreement comparator module to generate a property vector for the molecule being learned in 3D space. After all of the vectors for all of the atoms learned are understood by the agreement comparator module, then the agreement comparator module can train with machine learning algorithms to compare whether one or more atom vector fields 106 to a molecule vector field in a 3D dimension space and determine if they are approximately a same. Note, a structure of a molecule is formed by atoms in the 3D dimension space. The one or more 3D vector field modules transform molecular vector values and atom vector values to ensure these values are compared in a same 3D space and coordinate space. Thus, the agreement comparator module, molecular vector module, and 3D vector field module iteratively cooperate to supply a molecule vector field in 3D space, for a molecule being learned until the network in the machine learning model of the agreement comparator module can repeatedly accurately match up a molecule vector field to corresponding atom vector fields 106.

Each stage of the Artificial Intelligence engine 100, (e.g. the agreement comparator module cooperation with its corresponding modules, the atom properties module cooperation with the atom vector module, the molecule property predictor module cooperation with the molecule vector module, and the atom and molecule encoder with the atom vector module and the molecule vector module, during training of the machine learning the agreement comparator module runs through, for example, at least two million examples of representative molecules in a vector space.

The training of these three stages can all occur in parallel. After this, then just a little more training is required for the three stages to work cooperatively during training and when deployed for operation.

Step 4. The modules can be trained (and thus later when deployed) 1) to receive an input of a set of atoms via the atom and molecule encoder and then 2) from the molecule property predictor module to present in the output module i) a resulting molecule, ii) a composition of atoms in the resulting molecule, iii) a set of properties for the resulting molecule, including the structure of the molecule in 3-dimensional space, and iv) any combination of these three, resulting from the inputted set of atoms.

A set of unlabeled or labeled atoms can be inputted via the atom and molecule encoder module and through the atom vector module to the atom properties module. Each module performs its train and/or coded function as discussed above. The atom properties module will output the known values of atom properties for the inputted atoms. The agreement comparator module, the 3D vector field module, and the atom vector module will create a semantic 3D vector field for all of the atom vector values. The molecule vector module and the 3D vector field and agreement comparator module will iteratively cooperate via a learning algorithm, such as Gradient Descent, to determine one or more molecules with a molecule vector field 108 that approximately matches (e.g. agrees) with the atom vector field 106 in 3D space, and thus, the one or more matching molecular vector values. The molecular vector module inputs the molecular vector value of a candidate molecule that matches with the atom vector field 106 in 3D space to the property predictor module, which performs its function to output what the molecular properties will be for the molecule resulting from the input atoms and/or likely resulting molecules.

Step 5. In a reverse flow through the modules, the modules can be trained (and thus later when deployed) 1) to receive an input of a molecule via the atom and molecule encoder and then 2) from the atom properties module to present in the output module i) a resulting composition of the atoms for that molecule, ii) a set of properties for each of the atoms, including each atom's arrangement/position in 3-dimensional space, and iii) any combination of these two, resulting from the inputted molecule.

Step 6. The modules can be trained (and thus later when deployed) 1) to receive an input of a set of atom properties to the atom properties module and then 2) from the molecule property predictor module to present in the output module i) a resulting molecule, ii) a composition of atoms for the resulting molecule, iii) a set of properties for the resulting molecule including the molecule's structure in 3-dimensional space, and iv) any combination of these three, resulting from the inputted set of atom properties.

Step 7. The modules can be trained (and thus later when deployed) 1) to receive an input of a set of desired/targeted properties for a molecule to the molecule property predictor module and then 2) from the atom properties module to output present in the output module i) a resulting composition of atoms for the molecule with the desired/targeted set of properties ii) each atom's arrangement/position in 3-dimensional space for the molecule with the desired/targeted properties, and any combination of these two, resulting from the inputted set of desired/targeted properties.

When these three stages have completed training to work cooperatively, then the Artificial Intelligence engine 100 and its modules that have been trained and coded to perform their functions cooperatively can be deployed for use in the field.

ADDITIONAL DETAILS AND EXAMPLES

The Artificial Intelligence engine 100 that has been already trained has an input module 104 for performing operations including an inverse design on targeted properties of a molecule. An input module 104 is configured to accept, via a user interface and/or API, one or more targeted molecular properties by a user and request that the trained modules of the Artificial Intelligence engine 100 cooperate to conduct any of the example operations below. In an example, the input module 104 can supply the information to the atom and molecule encoder, directly to the atom vector module, and/or directly to the molecule vector module, directly to atom properties module and/or molecule property predictor module, and any combination of these.

In deployment, the Artificial Intelligence engine 100 and its one or more already trained machine learning models in the modules of the Artificial Intelligence engine 100 can perform example operations, such as the four operations A.-D. below.

A. In deployment, an example machine learning process implemented in the Artificial Intelligence engine 100 can be as follows.

In a first approach, 1) an input module 104 can receive an input of a set of desired/targeted properties for an unlabeled molecule from a user, which can be supplied to a molecule property predictor module as an output target to achieve, 2) where the molecule vector module is trained to iteratively supply candidate molecular vector values into the property predictor module until one or more candidate molecular vector values are found that satisfy the supplied targeted properties for the unlabeled molecule, and then 3) the atom properties module is configured to supply to an output module, i) a resulting composition of atoms for a molecule found that is likely to have the desired/targeted set of properties, ii) an indication of each atom's arrangement/position in 3-dimensional space for the molecule found with the desired/targeted properties, and iii) any combination of these two, resulting from the set of desired/targeted properties inputted to the input module 104. Note, the unlabeled molecule's current identity or composition is not supplied to the Artificial Intelligence engine 100.

In another approach, 1) the input module 104 can receive an input of a set of desired/targeted properties for an unlabeled molecule from a user, which is supplied directly to the molecule property predictor module, 2) a reverse flow process through the property predictor module yields one or more candidate molecular vector values to start an adaptive process on the finding one or more molecules that satisfy the supplied targeted properties for the unlabeled molecule, and then 3) the atom properties module is configured to supply to an output module i) a resulting composition of atoms for a molecule found that is likely to have the desired/targeted set of properties, ii) an indication of each atom's arrangement/position in 3-dimensional space for the molecule found with the desired/targeted properties, and iii) any combination of these two, resulting from the inputted set of desired/targeted properties. In this approach, a reverse-flow of information occurs in the molecule property predictor module, which can cooperate with the molecule vector module to supply initial candidate molecular vector values that contain most if not all of the set of targeted properties as a starting point.

In the first approach, a logical flow of the process can be as follows. The input module 104 can receive an input of a set of desired/targeted properties for an unlabeled molecule (whose current identity or composition is not supplied to the Artificial Intelligence engine 100).

The local structure of a molecule can be obtained by using the Artificial Intelligence engine 100's approach of searching for one or more embeddings that satisfy the target properties' criteria via the use of a machine learning algorithm iteratively going through possible embeddings rather than learning a mapping from input features to embeddings.

The machine learning model in the Artificial Intelligence engine 100 can start with an initial candidate of a molecular vector value.

The molecule vector module can supply an initial candidate of a molecular vector value based on many factors, such as i) expert intuition (e.g. a chemist), cross-referencing internal knowledge, ii) a database, of previously tested and/or learned molecular vector values that have been correlated to one or more of the target properties for a molecule under analysis, and iii) other knowledge sources—e.g. physics and chemistry literature. Note, a user may also manually input an initial candidate molecule, which is encoded to a molecular vector value through an atom and molecule encoder cooperating with the molecule vector module.

The machine learning model in the Artificial Intelligence engine 100 can find one or more molecular vector values that satisfy achieve/satisfy the set of targeted properties for an unlabeled molecule. The molecule vector module feeds each candidate molecular vector value to the already trained molecule property predictor module, which outputs a resulting molecule and the properties of that resulting molecule based on its structure. A comparison can be made to see if the resulting molecule and the properties of that resulting molecule do or do not satisfy/achieve the set of targeted properties for the unlabeled molecule submitted by the user. The Artificial Intelligence engine 100 is configured to adapt molecular vector values, starting with the initial candidate molecular vector value, until one or more instances of the candidate molecular vector values achieve/satisfy the set of targeted properties for the unlabeled molecule. Again, the Artificial Intelligence engine 100 can adapt molecular vector values from the initial candidate molecular vector value by iteratively creating and submitting molecular vector values through the molecule vector module to the molecule property predictor that is already trained with its feature weights and coefficients locked down. The molecule vector module and the molecule property predictor can adapt instances of molecular vector values, via iteration through, for example, gradient descent. During the machine learning process to find a molecular vector value that satisfies/achieves the target properties for the unlabeled molecule, the Artificial Intelligence engine 100 can factor in chemistry knowledge and other forms of knowledge to act as constraints to adapt instances of the molecular vector value until a molecular vector value is found to achieve/satisfy the target properties for the unlabeled molecule. Now that the machine learning model in the Artificial Intelligence engine 100 has found a molecular vector value for the unlabeled molecule that can achieve the target properties, the machine learning process may now advance to the next stage.

The Artificial Intelligence engine 100 can generate a 3D vector field for the molecule that was found to satisfy the target properties for the unlabeled molecule. Once a candidate molecular vector value is found for the unlabeled molecule that achieves the desired target properties, then the 3D vector field module is configured to transform and map the molecular vector value for the unlabeled molecule that achieves the desired target properties, from the molecular vector module into a vector field in 3D space.

Next, the atom vector module and the 3D vector field cooperate to generate a property vector at every point in the 3D space. The agreement comparator module is already trained with machine learning algorithms to compare an atom vector field 106 to a molecule vector field 108 in a 3-dimensional space and determine if they are approximately the same. Note, a structure of a molecule is formed by atoms in a 3-dimensional space.

The 3D vector field is configured to work with the atom vector values and/or molecular vector values to put these vector values into the same 3D coordinate space. This captures the global structure of the molecule by locating atoms in 3-dimensional space and projecting their embeddings to generate a continuous 3-dimensional embedding vector field. The agreement comparator module is already trained with machine learning algorithms with their feature weights and coefficients locked down to learn how to map molecule vectors to atom vectors so that they are approximately the same. For example, the machine learning model in the agreement comparator module can compare molecule vectors of the candidate molecule to the molecule of the in this over X amount of vectors, such as 5 vectors in the exact same 3D space. (See for example FIG. 8)

The Artificial Intelligence engine 100 can find matching atom vector values. Once the Artificial Intelligence engine 100 has created the semantic molecule vector field for the unlabeled molecule, now the agreement comparator module and the atom vector module can cooperate to find atom vector values for atoms that match the molecule vector field 108 for the unlabeled molecule in 3D space. The agreement comparator module and the atom vector module then cooperate to learn the atom embeddings to reconstruct the embeddings of the molecule vector field 108.

The atom vector module, the 3D vector field module, and the agreement comparator module cooperate to perform an iterative machine learning process to find one or more candidate atom vector fields 106 that approximately agree with the molecule vector field 108 in 3D space. The atom vector module can put in a candidate atom vector value and then use, for example, a gradient descent iteration, until an atom vector value is found that at least comes close to matching the semantic vector field in the 3D space from the molecular vector value that has the set of target properties. The machine learning with candidate instances of atom vectors learns the particular atom vector values that match up approximately with the molecule vectors from the unlabeled molecule that meet the set of target properties in 3D space. This captures the global structure of the unlabeled molecule.

Note, the different stages of the machine learning can incorporate prior knowledge about structure. In deployment, chemist intuition, physics knowledge, and physical knowledge can act as constraints to adapt learned atom vector structures, and relations between substructures to molecule vectors in the Agreement 3D space to fit chemist intuition constraints and physics knowledge constraints. The chemist intuition, physics knowledge, and physical knowledge can help with choosing, for example, an initial instance of atom vectors to start with, which based on this knowledge has a better chance to match up rather than a random instance of atom vector values. The chemist intuition, physics knowledge, and physical knowledge also can act as constraints written in as rules speed up and focus the machine learning of these atom vector values that approximately match up the molecule vectors.

In an embodiment, the agreement comparator module and the atom vector module adapt the atom vector representations and the molecule vector representations to fit chemist intuition and physical knowledge, which can be graphed into a network understandable by the machine learning model.

Next, the atom vector values for the atoms matching up with molecule vectors in the 3D space have been found. The atom vector module then feeds the atom vector values to the already trained atom properties module. The atom properties module maps the atom vector values to atom properties. The atom properties module is configured to present in the output module i) a resulting arrangement of atoms for a molecule that is found to likely to have the desired/targeted set of properties ii) an indication of each atom's arrangement/position in 3-dimensional space for the molecule with the desired/targeted properties, and iii) any combination of these two, resulting from the inputted set of desired/targeted properties.

These Artificial Intelligence methods can generate new compounds. The Artificial Intelligence engine 100 can search directly for an embedding of an unlabeled molecule having such properties dictated by what the user wants to target. This by itself enables the Artificial Intelligence engine 100 to be unsupervised (i.e., learned from unlabeled data). The modules of the Artificial Intelligence engine 100 can cooperate to present a representation of a molecule found to satisfy the user's targeted properties with both the local and global structure of that molecule and that molecule can be learned from unlabeled molecules.

B. The modules can cooperate to perform an operation 1) to receive an input of a set of atom properties to the atom properties module and then 2) from the molecule property predictor module to present in the output module i) a resulting molecule, ii) a composition of atoms for the resulting molecule, iii) a set of properties for the resulting molecule including the molecule's structure in 3-dimensional space, and iv) any combination of these three, resulting from the inputted set of atom properties.

The modules operate similarly as trained and discussed herein. However, the flow of information starts at the atom properties module and then through the atom vector module, to the 3D vector field module, up to the agreement comparator module, down to the 3D vector field module and the molecule vector module, and finally through the molecule property predictor module.

C. The modules can cooperate to perform an operation 1) to receive an input of a set of atoms via i) the atom and molecule encoder or ii) directly supplied to the atom vector module manually by a user and then 2) from the molecule property predictor module to present in the output module i) a resulting molecule, ii) a composition of atoms in the resulting molecule, iii) a set of properties for the resulting molecule, including the structure of the molecule in 3-dimensional space, and iv) any combination of these three, resulting from the inputted set of atoms.

The modules operate similarly as trained and discussed herein. However, the flow of information starts at the atom properties module and then through the atom vector module, to the 3D vector field module, up to the agreement comparator module, down to the 3D vector field module and the molecule vector module, and finally through the molecule property predictor module.

D. In a reverse flow through the modules, the modules can cooperate to perform an operation 1) to receive an input of a molecule via i) the atom and molecule encoder or ii) manually to the molecule vector module, and then 2) from the atom properties module to present in the output module i) a resulting composition of the atoms for that molecule, ii) a set of properties for each of the atoms, including each atom's arrangement/position in 3-dimensional space, and iii) any combination of these two, resulting from the inputted molecule.

The modules operate similarly as trained and discussed herein. However, the flow of information starts at the molecule vector module, to the 3D vector field module, up to the agreement comparator module, down to the 3D vector field module and the atom vector module, and finally through the atom properties module.

Figure 7:
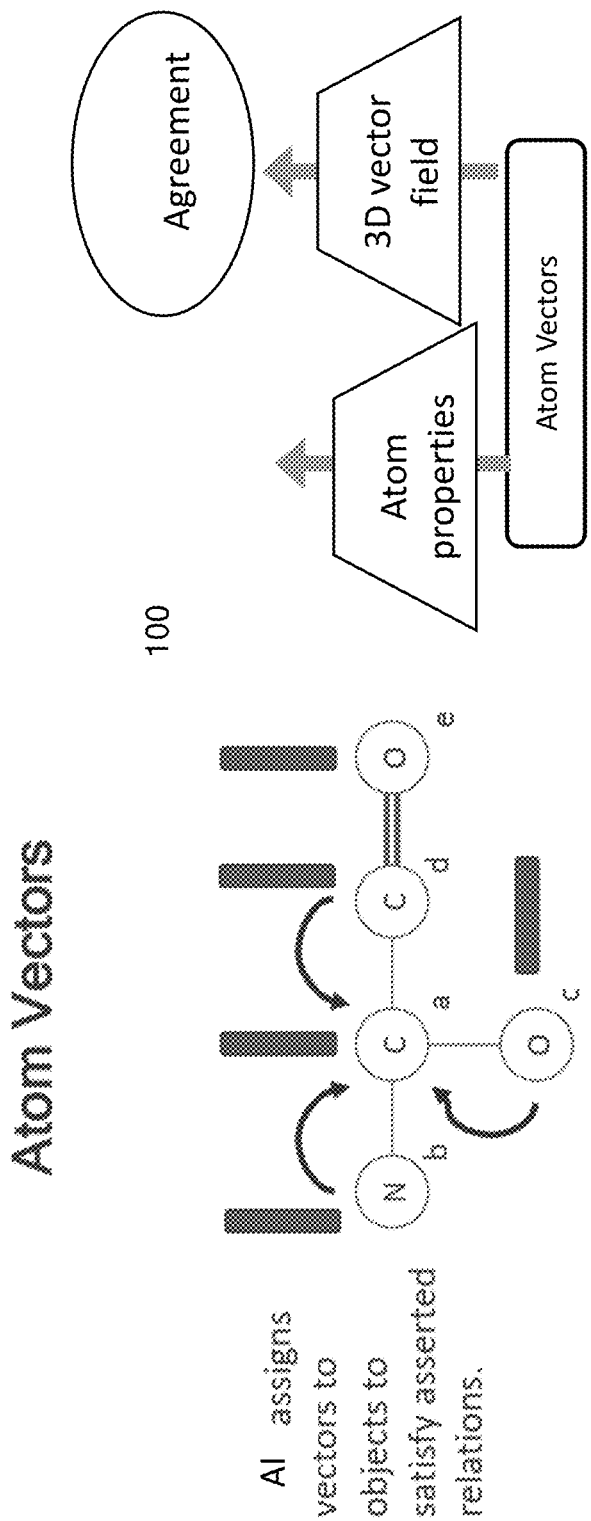
FIG. 7 illustrates an embodiment of a diagram of an example atom vector module configured to cooperate with one or more transformers to map atom vectors to a 3-dimensional space.

FIG. 7 illustrates an embodiment of a diagram of an example atom vector module configured to cooperate with one or more transformers, such as a 3D vector field module, to map atom vectors to a 3-dimensional space.

The machine learning algorithm can assign vectors to objects making up the atom and/or the set of atoms in order to satisfy asserted relations. The vectors can indicate, for example, a double bond exists between the oxygen atom and neighboring carbon atom. A single bond exists between the nitrogen, oxygen and carbon atoms at positions b+c+d. Note, single bonded (a) and double bonded (a) refer to the bonds to the atom (e.g. Carbon) at "a". Each atom, such as the nitrogen atom, the first carbon atom, and the second carbon atom can be treated as objects represented with vectors. The vectors can be a sequence of numbers and or symbols. For example, the vector value (3, 5, 7) indicates a point (e.g. an X, Y, Z coordinate) in a 3D space. (see for example FIG. 8)

Next, the Artificial Intelligence engine 100 can construct, for example, a neural network structured on expert knowledge and then can train the neural network based on empirical data. The Artificial Intelligence engine 100 can use logical operators for the nodes in the constructed neural networks. The Artificial Intelligence engine 100 can have relations represented as sub-networks in the neural networks.

Figure 8:
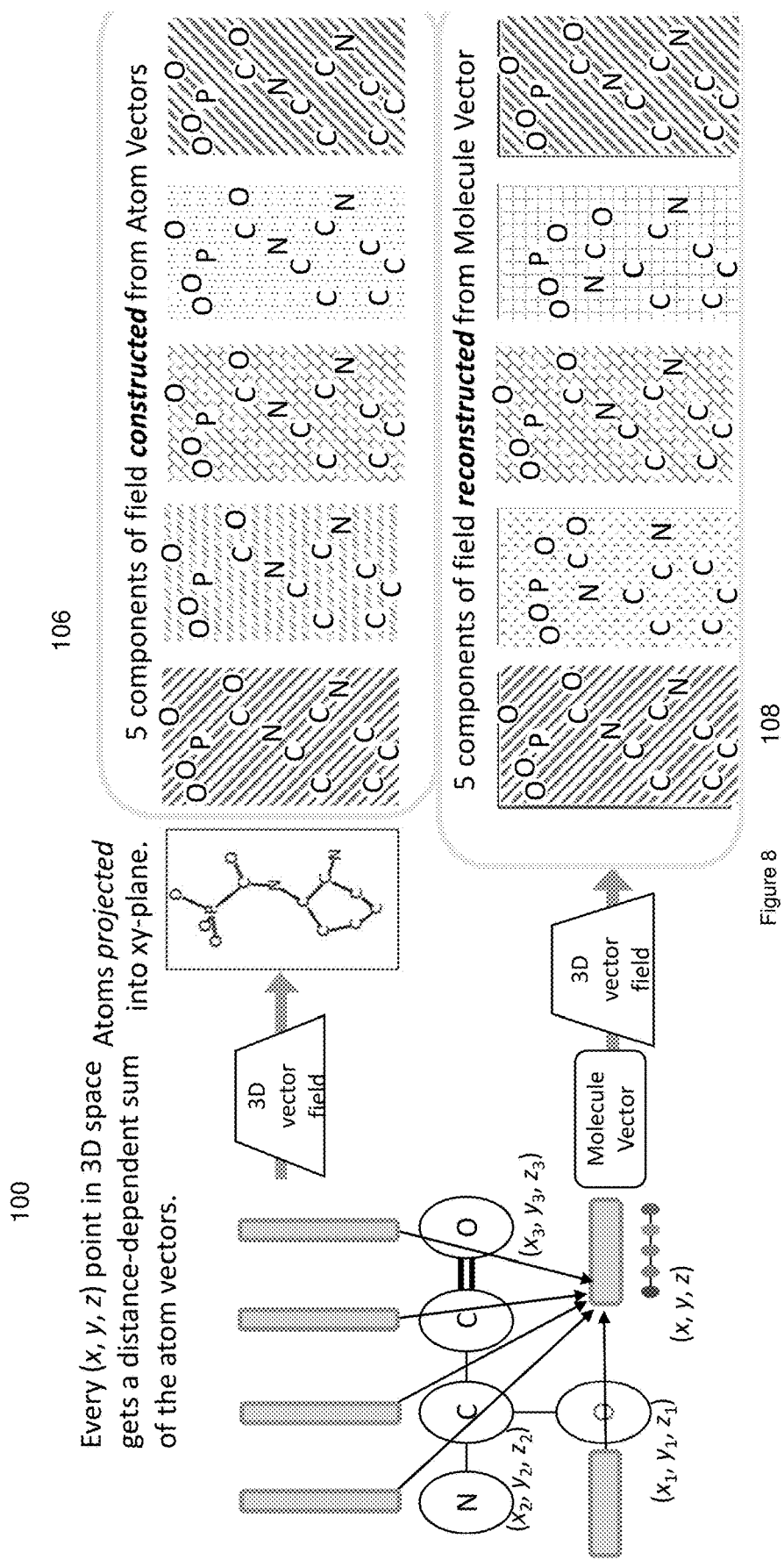
FIG. 8 shows a mapping of atom vectors to a 3-dimensional space as well as mapped to molecule vectors to the 3-dimensional space with a same coordinate system to allow for a proper comparison of the atom vectors to the molecule vectors because a molecule is a 3-dimensional object and an arrangement of the atoms within that 3-dimensional space.

FIG. 8 shows a mapping of atom vectors to a 3-dimensional space as well as mapped to molecule vectors to the 3-dimensional space with a same coordinate system to allow for a proper comparison of the atom vectors to the molecule vectors because a molecule is a 3-dimensional object and an arrangement of the atoms within that 3-dimensional space. In this example, the semantic vector field of the candidate molecule and its geometric structure is displayed. Every (x, y, z) vector point in 3D space can get a distance-dependent sum of the atom vectors. Each vector point in 3D space gets displayed. The machine learning model may select a 2D surface from 3D space based on reference to nearest atoms. In an example, the machine learning model maps the vectors to colors by similarity.

The machine learning model has been trained to encode the molecule vectors and their 3D relationships between atom vectors.

The machine learning model has been trained to reconstruct molecule vectors in the space by comparing them to atom vectors generated by the atoms (and vice versa). When creating the atom vector field 106, a portion of the atom vector values such as (x2, y2, z2) coordinates help project the atoms into 3-dimensional space.

The machine learning model maps, for example, five separate example atoms and/or set of atoms of carbon, oxygen, nitrogen, and others into an atom vector field 106 constructed from atom vector values. The machine learning model maps an example molecule and its molecule vector field (that has carbon, oxygen, nitrogen, and others) to the five separate example atoms and/or set of atoms as illustrated. In this way, a molecule (made up atoms and/or sets of atoms) is reconstructed from a molecule vector value that approximately agrees with the atom vector field 106. In this example, the atom vectors in the first, third, and fifth boxes almost exactly match up from atom vectors to molecule vectors as well as the second and fourth boxes have the same atoms but differ between the molecule vectors and atom vectors in 3D space. Note, in this case, the comparison would still loosely agree and thus be approximately the same.

Again, the agreement comparator module has been trained to use machine learning algorithms, such as gradient descent, to iteratively compare an instance of the atom vector field 106 to a molecule vector field in a 3D dimension space (and vice versa molecule vector field to atom vector field 106) and determine if they are approximately the same. Again, the structure of the molecule formed by atoms in the 3 dimensional space is compared to atom vectors in 3 dimensional space.

The machine learning network in the agreement comparator module is trained to look at a comparison of atom vectors to molecule vectors, and then include loose matches as a potential positive agreement of those two vectors in 3-dimensional space. Thus, loose approximate matches of atom vectors to molecule vectors can be satisfactory, (rather than a need for exact matches). This helps the agreement comparator module determine something unknown (such as a hypothetical molecule that should have a desired set of target properties) in the semantic vector space. The semantic vector fields of the atoms vectors and molecule vector can be approximately the same (roughly in the same neighborhood), which means they will have approximately the same molecular properties.

In an embodiment, the machine learning network in the agreement comparator module can use an imaging algorithm to match up 'X' amount of vector points, such as 5 points, between the two vector fields to see if they approximately match up. When, for example, a majority of the compared vector points match up and the remainder are close in the neighborhood, then the atom vectors will be considered to approximately match the molecule vectors.

FIG. 9 illustrates an embodiment of a diagram of an example input module that is configured to receive and supply information from one or more knowledge sources, including at least information from a chemistry expert, to act as one or more constraints to adapt the machine learning to find a candidate molecule vector field to agree with an atom vector field 106 in order to fit the constraints created by the information.

Chemists may have intuition about structures for a given target to constrain semantic vector field of properties of the molecule in 3D space, such as a ring structure needs to be present, and/or a certain geometric relation to each other needs to be present, and/or certain atoms must be paired, etc. The neural network can use the constraints from the knowledge sources when learning to recognize these patterns and relationships in 3D space and corresponding molecule vectors having these 3D geometric relationships. Thus, the machine learning can utilize these relationship constraints put in by the chemistry expert while still trying to solve for molecule vectors that meet substantially the known values of atom properties and/or target/desired properties of the molecule and corresponding molecule vectors.

Next, a set of targeted properties from a user can be supplied to a molecule property predictor module as an output target for a machine learning algorithm to achieve when trying to find the one or more candidate molecules that satisfy the set of targeted properties. The machine learning process iteratively supplies candidate molecular vector values into the property predictor module until one or more candidate molecular vector values are found that satisfy the supplied targeted properties (goal for the learning algorithm) for the unnamed molecule. After finding each candidate molecular vector value that satisfies the supplied targeted properties for the unnamed molecule, then transforming each candidate molecular vector value into a 3-dimensional vector field for that candidate molecular vector value that indicates the structure of the candidate molecule. Thus, the Artificial Intelligence engine 100 is coded with intelligence in an automated fashion for the machine learning to logically adapt the molecular design of target properties to molecules in existence or even still a hypothetical molecule yet to be found as naturally occurring in nature and/or created in a laboratory but has a similar geometric structure to previously learned geometric structures corresponding to the set of targeted properties.

FIG. 10 illustrates an embodiment of a diagram of an example Artificial Intelligence engine recognizing patterns of structures in molecules so that molecular properties can be correlated to structural properties in the molecule. The Artificial Intelligence engine 100 uses a machine learning module trained to iteratively submit molecule vector values corresponding to a geometric structure of one or more candidate molecules in 3-dimensional space. The molecule vector values correspond to the geometric structure of the one or more candidate molecules. These molecule vector values and structures can include a merely hypothetical molecule yet to be found as naturally occurring in nature and/or created in a laboratory. The molecule vector values are iteratively submitted from the molecule vector module to the molecule property predictor to check when a first candidate molecule is found that satisfies the set of targeted properties.

In an embodiment, an example neural network applies a computer vision technique in 3D space to train the neural network to recognize moieties. As discussed, the neural network naturally generalizes to molecules that were not captured by the structure-based rules. The neural network was trained to learn to recognize moieties/portion of a molecule (e.g. groups of atoms) with a particular function and structure to that portion of a molecule and then label each distinct pattern of atom structures as its own region in the semantic vector field. For example, the trained neural network characterizes each different moiety of atoms with either an ellipsoid in 3D space, and/or a ring of particular atoms with a circle in 3D space, etc. Each geometric structure can later be correlated to a property of the molecule. These moieties have similar patterns and relationships but do not have to exactly match the original molecule and its exact pattern. As a characteristic of the machine learning, the machine learning model learns to recognize patterns and then parameters, values, and effects associated with those patterns. The machine learning model naturally can characteristically generalize this understanding to sets of atoms with similar structure patterns that may not have been trained on.

FIG. 11 illustrates an embodiment of a diagram of an example Artificial Intelligence engine that can generate physics-based, vector representations for testing and predicting molecules.

The Artificial Intelligence engine 100 generates a representation of the candidate molecule and its geometric structure including the atoms composing the candidate molecule that has the targeted properties; rather than, just predicting or performing a look-up function for the properties of a molecule known to naturally occur in nature. The Artificial Intelligence engine 100 supplies the representation of the candidate molecule and its geometric structure, including the atoms composing the candidate molecule that has the targeted properties, to the user on 1) a display screen, 2) in a printout, 3) as an electronic message, (e.g. email, text, instant message, etc.) sent to an account of the user, and 4) any combination these three.

The Artificial Intelligence engine 100 can cooperate with a database of molecules and properties of molecules including the geometric structure. The Artificial Intelligence engine 100 in response to a query on a set of targeted properties submitted by a user, can determine whether does a molecule in the existing molecule database satisfy the set of targeted properties? If yes, send the molecule and its geometric structure to the user. If not, go through the trained modules and evaluate with the machine learning models for one or more candidate molecules that can have the set of targeted properties for molecules. When looking for candidate molecules to satisfy the set of targeted properties, then the Artificial Intelligence engine 100 can extract information for various data sources to pull in information to act as constraints on the machine learning process to find a matching candidate molecule as well as an information source on the geometric structure of atoms and molecules. The Artificial Intelligence engine 100 is coded with intelligence to determine the appropriate data source to query and extract data from that particular data source. A candidate molecule satisfying the set of targeted properties can also have its atomic composition and geometric structure sent to be synthesized and tested.

Network

FIG. 12 illustrates a diagram of a number of electronic systems and devices communicating with each other in a network environment in accordance with an embodiment of the Artificial Intelligence engine. The network environment 800 has a communications network 820. The network 820 can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network 820 is the Internet. As shown, there may be many server computing systems and many client computing systems connected to each other via the communications network 820. However, it should be appreciated that, for example, a single client computing system can also be connected to a single server computing system. Thus, any combination of server computing systems and client computing systems may connect to each other via the communications network 820.

The system containing the Artificial Intelligence engine 100 can use a network like this to supply training data to create and train a machine learning network. The Artificial Intelligence engine 100 can also reside and be implemented in this network environment, for example, in the cloud platform of server 804A and database 806A, a local server 804B and database 806B, on a device such as laptop 802D, in a smart system such as smart automobile 802D, and other similar platforms.

The communications network 820 can connect one or more server computing systems selected from at least a first server computing system 804A and a second server computing system 804B to each other and to at least one or more client computing systems as well. The server computing system 804A can be, for example, the one or more server systems 220. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., laptop computer), a third mobile computing device or second portable computer 802F (e.g., tablet with an Android- or iOS-based operating system), a smart device or system incorporated into a first smart automobile 802D, a smart device or system incorporated into a first smart bicycle, a first smart television 802H, a first virtual reality or augmented reality headset 804C, and the like. The client computing system 802B can be, for example, one of the one or more client systems 210, and any one or more of the other client computing systems (e.g., 802A, 802C, 802D, 802E, 802F, 802G, 802H, and/or 804C) can include, for example, the software application or the hardware-based system in which the training of the Artificial Intelligence can occur and/or can be deployed into. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer 802B (e.g., the client computing system) and the server computing system 804A can both initiate and respond to communications, their communications can be viewed as peer-to-peer. Additionally, the server computing systems 804A and 804B include circuitry and software enabling communication with each other across the network 820. Server 804B may send, for example, simulator data to server 804A.

Any one or more of the server computing systems can be a cloud provider. A cloud provider can install and operate application software in a cloud (e.g., the network 820 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser-based applications, 3) the request and response cycle from a dedicated on-line server, 4) the request and response cycle directly between a native application resident on a client device and the cloud-based remote access to another client computing system, and 5) combinations of these.

In an embodiment, the server computing system 804A can include a server engine, a web page management component or direct application component, a content management component, and a database management component. The server engine can perform basic processing and operating-system level tasks. The web page management component can handle creation and display or routing of web pages or screens associated with receiving and providing digital content and digital advertisements, through a browser. Likewise, the direct application component may work with a client app resident on a user's device. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In an embodiment, a server computing system can be configured to display information in a window, a web page, or the like. An application including any program modules, applications, services, processes, and other similar software executable when executed on, for example, the server computing system 804A, can cause the server computing system 804A to display windows and user interface screens in a portion of a display screen space.

Each application has a code scripted to perform the functions that the software component is coded to carry out such as presenting fields to take details of desired information. Algorithms, routines, and engines within, for example, the server computing system 804A can take the information from the presenting fields and put that information into an appropriate storage medium such as a database (e.g., database 806A). A comparison wizard can be scripted to refer to a database and make use of such data. The applications may be hosted on, for example, the server computing system 804A and served to the specific application or browser of, for example, the client computing system 802B. The applications then serve windows or pages that allow entry of details.

Computing Systems

FIG. 13 illustrates a diagram of an embodiment of one or more computing devices that can be a part of the systems associated with the Artificial Intelligence engine discussed herein. The computing device 900 may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of this system that are implemented in software 944, 945, 946 may be stored in the one or more memories 930-932 and are executed by the one or more processors 920.

The system memory 930 includes computer storage media in the form of volatile and/or nonvolatile memory such as read-only memory (ROM) 931 and random access memory (RAM) 932. These computing machine-readable media can be any available media that can be accessed by computing system 900. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media.

The system further includes a basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, the system has a solid-state memory 941. The solid-state memory 941 is typically connected to the system bus 921 through a non-removable memory interface such as interface 940, and USB drive 951 is typically connected to the system bus 921 by a removable memory interface, such as interface 950.

A user may enter commands and information into the computing system 900 through input devices such as a keyboard, touchscreen, or software or hardware input buttons 962, a microphone 963, a pointing device and/or scrolling input component, such as a mouse, trackball or touch pad. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resonant on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, the system has remote application programs 985 as residing on remote computing device 980. It will be appreciated that the network connections shown are examples and other means of establishing a communications link between the computing devices that may be used.

As discussed, the computing system 900 can include mobile devices with a processing unit 920, a memory (e.g., ROM 931, RAM 932, etc.), a built-in battery to power the computing device, an AC power input to charge the battery, a display screen, a built-in Wi-Fi circuitry to wirelessly communicate with a remote computing device connected to the network.

It should be noted that the present design can be carried out on a computing system such as that described with respect to shown herein. However, the present design can be carried out on a server, a computing device devoted to message handling, or on a distributed system in which different portions of the present design are carried out on different parts of the distributed computing system.

In some embodiments, software used to facilitate algorithms discussed herein can be embedded onto a non-transitory machine-readable medium. A machine-readable medium includes any mechanism that stores information in a form readable by a machine (e.g., a computer). For example, a non-transitory machine-readable medium can include read-only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, HTTP, Java, Python, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. Any portions of an algorithm implemented in software can be stored in an executable format in a portion of a memory and is executed by one or more processors. In an embodiment, a module can be implemented in electronic hardware such as logic and other electronic components to perform the functions discussed for that module, software as a block of executable code coded to perform the functions discussed for that module, and/or a combination of software cooperating with electronic hardware.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
an Artificial Intelligence engine composed of two or more modules that use one or more machine learning models;
a first machine learning model in a molecule property predictor module is trained to learn to predict molecular properties of a particular molecule;
a molecule vector module is configured to represent a known molecule with its known geometric arrangement of that molecule in 3-dimensional space in vector format, where a portion of a vector value for the known molecule includes coordinate points in the 3-dimensional space, where the molecule property predictor module is configured to cooperate with the molecule vector module to predict molecular properties from a molecule vector field in 3-dimensional space;
an atom vector module configured to correlate an atom in a set of two or more atoms to atom vectors for that atom that reflect an identity of the atom itself as well as an arrangement of a geometric structure of the atom in 3-dimensional space, where a portion of a vector value for the atom includes coordinate points in the 3-dimensional space;
where an input module is configured to cooperate with the molecule vector module, the molecule property predictor module, and the atom vector module, to allow these modules to apply the one or more machine learning models to allow a user 1) to input two or more atoms and have the first machine learning model in the molecule property predictor module output a set of properties for a resulting molecule formed by the two or more atoms, as well as 2) to supply an input of a set of targeted properties for an unlabeled molecule and have the first machine learning model output a set of atoms and a geometric structure in the 3-dimensional space for the unlabeled molecule; and
where at least one of i) the output the set of atoms and the geometric structure in the 3-dimensional space for the unlabeled molecule and ii) the output the set of properties for the resulting molecule formed by the two or more atoms is supplied to a user 1) on a display screen, 2) in a printout, 3) as an electronic message, and 4) any combination of these three, where any software instructions implemented in the input module, the molecule vector module, the molecule property predictor module, the atom vector module, and the one or more machine learning models are stored in an executable state in one or more non-transitory machine-readable mediums and are executed by one or more processor units.

2. The apparatus of claim 1, further comprising:
an agreement comparator module having a second machine learning model trained to compare an atom vector field to the molecule vector field in the 3-dimensional space and determine when they are approximately the same, where the geometric structure of the unlabeled molecule is formed by the set of atoms in the 3-dimensional space.

3. The apparatus of claim 1, where the atom vector module and the molecule vector module are configured to cooperate with one or more transformers to map atom vectors to the 3-dimensional space as well as to map molecule vectors to the 3-dimensional space with a same coordinate system to allow for a proper comparison of the atom vectors to the molecule vectors.

4. The apparatus of claim 1, where the AI engine is configured to receive and use information from one or more knowledge sources, including at least information from a chemistry expert, to act as one or more constraints to adapt a machine learning to find a candidate molecule vector field to agree with an atom vector field in order to fit the constraints created by the information.

5. The apparatus of claim 1, where the first machine learning model in the molecule property predictor module is configured to learn to predict molecular properties of molecule, under analysis, to values of structural properties for that molecule under analysis by having a molecule semantic dependent vector field in each space of the molecule under analysis in the 3-dimensional space.

6. The apparatus of claim 1, where an atom properties module is configured to cooperate with an atom vector module to bilaterally predict atom properties to atom vector values so that an output layer of the atom properties module will produce i) an identity of an atom and ii) values of the atom properties for a supplied atom vector value.

7. The apparatus of claim 1, where the molecule vector module, the molecule property predictor module, and the atom vector module cooperate to analyze a geometric structure of the two or more atoms including the vector values making up a molecule in 3-dimensional space, and then correlate that over to one or more targeted properties likely to result for any molecule that contains a same set of two or more atoms or chemically very similar set of two or more atoms and their geometric structure within a given molecule in 3-dimensional space, as well as, an inverse process of analyzing a set of targeted properties desired and correlating that to one or more geometric structures of the two or more atoms making up a molecule in 3-dimensional space.

8. The apparatus of claim 1, where the first machine learning model is composed of at least one of a neural network and a decision tree.

9. The apparatus of claim 1, where information describing the atoms making up the molecule in the 3-dimensional space that includes the coordinates of the atom in the 3-dimensional space, and at least one of bond angles between atoms and type of valence bond between atoms.

10. The apparatus of claim 1, where the first machine learning model is trained to correlate structures in the 3-dimensional space to one or more properties resulting or likely to result for a reference molecule that i) contains a same or chemically very similar set of atoms within a given molecule and ii) a same or chemically very similar geometry in the 3-dimensional space of the set of atoms.

11. A non-transitory computer-readable medium including executable instructions that, when executed with one or more processor units, cause an Artificial Intelligence engine to perform operations as follows, comprising:
using a first machine learning model in a molecule property predictor module that is trained to learn to predict molecular properties of a particular molecule;
using a molecule vector module to represent a known molecule with its known geometric arrangement of that molecule in 3-dimensional space in vector format, where a portion of a vector value for the known molecule includes coordinate points in the 3-dimensional space;
using the molecule property predictor module to cooperate with the molecule vector module to predict molecular properties from a molecule vector field in a 3-dimensional space;
using an atom vector module to correlate an atom in a set of two or more atoms to atom vectors for that atom that reflect an identity of the atom itself as well as an arrangement of a geometric structure of the atom in 3-dimensional space, where a portion of a vector value for the atom includes coordinate points in the 3-dimensional space;
using an input module to cooperate with the molecule vector module, the molecule property predictor module, and the atom vector module, to allow these modules to apply the one or more machine learning models to allow a user 1) to put in two or more atoms and have the first machine learning model in the molecule property predictor module output a set of properties for a resulting molecule formed by the two or more atoms as well as 2) to supply an input of a set of targeted properties for an unlabeled molecule and have the first machine learning model output a set of atoms and a geometric structure in the 3-dimensional space for the unlabeled molecule; and
supplying at least one of i) the output the set of atoms and the geometric structure in the 3-dimensional space for the unlabeled molecule and ii) the output the set of properties for the resulting molecule formed by the two or more atoms to a user 1) on a display screen, 2) in a printout, 3) as an electronic message, and 4) any combination of these three.

12. The non-transitory computer-readable medium of claim 11 including further executable instructions that, when executed with the one or more processor units, cause the Artificial Intelligence engine to perform further operations, comprising:
using an agreement comparator module trained with a machine learning algorithm to compare an atom vector field to the molecule vector field in the 3-dimensional space and determine when they are approximately a same, where the geometric structure of the unlabeled molecule is formed by the set of atoms in the 3-dimensional space.

13. The non-transitory computer-readable medium of claim 11 including further executable instructions that, when executed with the one or more processor units, cause the Artificial Intelligence engine to perform further operations, comprising:

using the atom vector module and the molecule vector module to cooperate with one or more transformers in order to map atom vectors to the 3-dimensional space as well as to map molecule vectors to the 3-dimensional space with a same coordinate system to allow for a proper comparison of the atom vectors to the molecule vectors.

14. The non-transitory computer-readable medium of claim 11 including further executable instructions that, when executed with the one or more processor units, cause the Artificial Intelligence engine to perform further operations, comprising:

using the input module to receive and supply information from knowledge sources, including at least information from an expert source, to act as one or more constraints to adapt a machine learning to find a candidate molecule vector field to agree with an atom vector field in the 3-dimensional space to fit the constraints created by the information.

* * * * *